(12) United States Patent
Suess et al.

(10) Patent No.: US 12,442,901 B2
(45) Date of Patent: Oct. 14, 2025

(54) READOUT ARCHITECTURES FOR MOTION BLUR REDUCTION IN INDIRECT TIME-OF-FLIGHT SENSORS

(71) Applicant: OMNIVISION TECHNOLOGIES, INC., Santa Clara, CA (US)

(72) Inventors: Andreas Suess, San Jose, CA (US); Zheng Yang, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 1022 days.

(21) Appl. No.: 17/513,000

(22) Filed: Oct. 28, 2021

(65) Prior Publication Data

US 2023/0134910 A1 May 4, 2023

(51) Int. Cl.
| | |
|---|---|
| *G01S 7/4861* | (2020.01) |
| *G01S 7/4865* | (2020.01) |
| *G01S 17/89* | (2020.01) |
| *H04N 23/68* | (2023.01) |

(52) U.S. Cl.
CPC .......... *G01S 7/4861* (2013.01); *G01S 7/4865* (2013.01); *G01S 17/89* (2013.01); *H04N 23/682* (2023.01)

(58) Field of Classification Search
CPC .... G01S 7/4861; G01S 7/4865; G01S 7/4863; G01S 17/894; G01S 17/10; H04N 23/682
See application file for complete search history.

(56) References Cited

U.S. PATENT DOCUMENTS

2023/0088191 A1* 3/2023 Guo .................. G01S 7/4914
250/208.1

FOREIGN PATENT DOCUMENTS

CN 113359143 A * 9/2021 .............. G01S 17/10

OTHER PUBLICATIONS

Bernard Buttgen and Peter Seitz, "Robust Optical Time-of-Flight Range Imaging Base on Smart Pixel Structures," [Online], IEEE Transactions on Circuits and Systems—I: Regular Papers, vol. 55, No. 6, Jul. 2008 [retrieved Oct. 6, 2021 from IEEE Xplore], pp. 1-14.
Datasheet—EPC660, "3D TOF imager 320 ×240 pixel," 2019 ESPROS Photonics Corporation, [Online], <https://www.espros.com>, [retrieved Oct. 6, 2021], pp. 1-61.
Andreas Suss, "High Performance CMOS Range Imaging," doctoral dissertation, University Duisburg-Essen, Duisburg, Germany, Feb. 19, 2014, pp. 1-280.

(Continued)

*Primary Examiner* — Jennifer D Bennett
(74) *Attorney, Agent, or Firm* — Dorsey & Whitney LLP

(57) ABSTRACT

A time-of-flight pixel circuit includes a photodiode configured to generate charge in response to modulated light reflected from an object. First and second transfer transistors are coupled to the photodiode. The first transfer transistor transfers a first portion of charge from the photodiode in response to a first modulation signal and the second transfer transistor transfers a second portion of charge from the photodiode in response to a second modulation signal. The second modulation signal is an inverted first modulation signal. A first floating diffusion is coupled to the first transfer transistor to receive the first portion of charge in response to a first modulation signal. Each one of a first plurality of sample and hold transistors is coupled between a respective one of a first plurality of memory nodes and the first transfer transistor.

54 Claims, 6 Drawing Sheets

(56) References Cited

OTHER PUBLICATIONS

Robert Lange, "3D Time-of-Flight Distance Measurement with Custom Solid-State Image Sensors in CMOS/CCD-Technology," doctoral dissertation, University of Siegen, Siegen, Germany, Jun. 28, 2000, pp. 1-223.

Min-Sun Keel et al., "A 640×480 Indirect Time-of-Flight CMOS Image Sensor with 4-tap 7-um Global-Shutter Pixel and Fixed-Pattern Phase Noise Self-Compensation Scheme," [Online], Samsung Electronics Co., Ltd., 2019 Symposium on VLSI Circuits Digest of Tecnical Papers, [retrieved Oct. 6, 2021], pp. 1-2.

Yuya Shirakawa et al., "An 8-tap CMOS Lock-in Pixel Image Sensor for Short-Pulse Time-of-Flight Measurements," Shizuoka University, R-15, pp. 1-4.

Andrew Payne et al., "A 512–424 CMOS 3D Time-of-Flight Image Sensor with Multi-Frequency Photo Demodulation up to 130MHz and 2GS/s ADC," ISSCC 2014 / Session 7 / Image Sensors / 7.6; Microsoft, Mountain View, CA, Feb. 10, 2014, pp. 134-136.

A. Payne et al., "7.6-A 512–424 CMOS 3D Time-of-Flight Image Sensor with Multi-Frequency Photo-Demodulation up To 130MHz and 2GS/s ADC" [Presentation Slides], Microsoft © 2014 IEEE ISSCC: Feb. 10, 2014, pp. 1-23.

Cyrus S. Bamji et al., "1Mpixel 65nm BSI 320MHz Demodulated TOF Image Sensor with 3.5µm Global Shutter Pixels and Analog Binning," ISCC 2018 / Session 5 / Image Sensors / 5.8; Microsoft, Mountain View, CA, Feb. 12, 2018, pp. 94-96.

Cyrus S. Bamji et al., "1Mpixel 65nm BSI 320MHz Demodulated TOF Image Sensor with 3.5µm Global Shutter Pixels and Analog Binning" [Presentation Slides], Microsoft Corp., Mountain View, CA; Paper 5.8: Feb. 12, 2018, pp. 1-26.

\* cited by examiner

READOUT ARCHITECTURES FOR MOTION BLUR REDUCTION IN INDIRECT TIME-OF-FLIGHT SENSORS

BACKGROUND INFORMATION

Field of the Disclosure

This disclosure relates generally to image sensors, and in particular but not exclusively, relates to time-of-flight sensors.

Background

Interest in three dimensional (3D) cameras is increasing as the popularity of 3D applications continues to grow in areas such as imaging, movies, games, computers, user interfaces, facial recognition, object recognition, augmented reality, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the 3D images. In addition, this technique is complex and therefore requires significant computer processing power in order to create the 3D images in real time.

For applications that require the acquisition of 3D images in real time, active depth imaging systems based on time-of-flight measurements are sometimes utilized. Time-of-flight cameras typically employ a light source that directs light at an object, a sensor that detects the light that is reflected from the object, and a processing unit that calculates the distance to the object based on the round-trip time it takes for the light to travel to and from the object.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
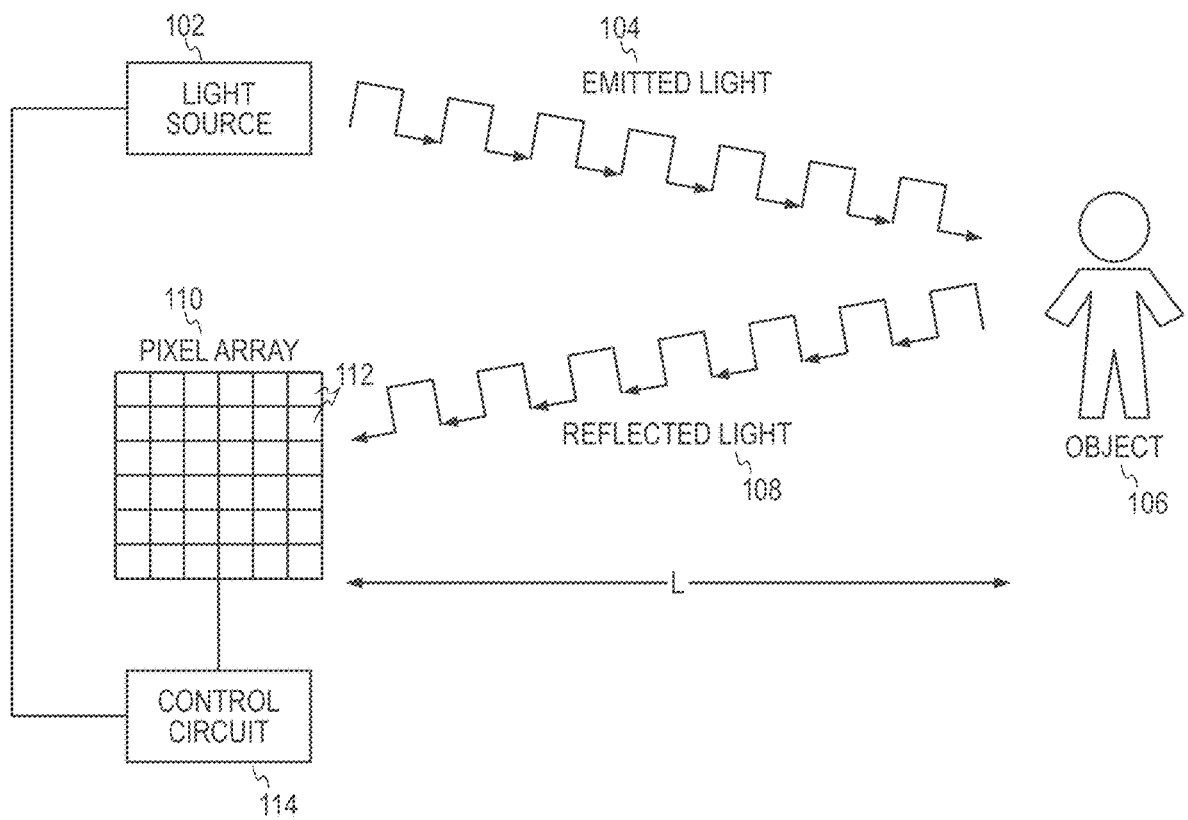
FIG. 1 is a block diagram that shows one example of a time-of-flight light sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to various embodiments of a time-of-flight pixel circuits included in pixel arrays of time-of-flight sensing systems are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of indirect time-of-flight (e.g., iTOF) sensing systems are disclosed in which modulated light is emitted from a light source to an object, which is then reflected from the object back to a time-of-flight pixel array included in the time-of-flight sensing system. The object distance is determined in response to the measured phase of the modulation sensed by the time-of-flight pixel circuits, which may be used to yield a 3D frame.

In various examples, the photodiode of each time-of-flight pixel circuit is coupled via a plurality of transfer transistors to a plurality of respective floating diffusions. In the various examples, each of the floating diffusions is coupled to a respective reset device as well as to a plurality of memory nodes via a plurality of respective sample and hold transistors. As such, each of the plurality of memory nodes is configured to capture a subframe of a portion of charge information from the photodiode and store the subframe of the portion of charge information during the acquisition of a subsequent subframe of a portion of charge information.

In the various examples, the plurality of memory nodes can then be read out in parallel with or subsequent to the acquisition and storage of one or more additional portions of charge information from the photodiode. With the capability of reading out the plurality of memory nodes in parallel with or subsequent to the acquisition and storage of one or more additional portions of charge information from the photodiode, the readout speed requirements from the time-of-flight pixel circuit is significantly relaxed, which enables motion blur performance to be improved significantly with little to no impact on integration time in an example time-of-flight pixel circuit in accordance with the teachings of the present invention. As such, it is appreciated that example time-of-flight pixel circuits in accordance with the teachings of the present invention provide time-of-flight pixel arrays capable of pipelined operation or burst operation with increased image resolution as the example time-of-flight pixel circuits impose less stress on readout speeds.

As will be discussed, phase measurements are taken from the various examples of the time-of-flight pixel circuits, which are modulated with 0°/180° and 180°/0° phase modulation signals as well as with 90°/270° and 270°/90° phase modulation signals in multiple subframes when sensing the reflected modulated light from the object. By modulating the time-of-flight pixel circuits with the opposing phases of the 0°/180° and 180°/0° phase modulation signals as well as with the opposing phases of the 90°/270° and 270°/90° phase modulation signals in the multiple subframes, offset errors as well as dark current errors in the time-of-flight pixel circuits are canceled or removed in accordance with the teachings of the present invention.

In the various example, the 0°, 90°, 180°, and 270° phase modulation signals are also modulated at multiple different frequencies in the multiple subframes. In the various examples, the 0°, 90°, 180°, and 270° phase modulation signals synchronized to have the same frequency as the modulated light that is emitted to the object from the light source of the time-of-flight sensing system to realize homodyne detection by the indirect time-of-flight sensor. Employing the different phases in the phase modulation signals allows to reconstruction of the encoded distance. Furthermore, measurements at additional frequencies and/or phases improve systematic errors such as harmonic distortions or multipath artifacts.

It is noted that phases that are increments of 360° apart cannot be distinguished, which consequently results in ambiguities in the measurements. As a result, the modulation frequency of the phase modulation signals is chosen not to exceed a maximum modulation frequency in order to accommodate a desired depth range. However, a tradeoff is that increasing the modulation frequency improves precision.

To illustrate, FIG. 1 is a block diagram that shows one example of a time-of-flight light sensing system 100 in accordance with the teachings of the present invention. In the depicted example, time-of-flight light sensing system 100 is a 3D camera that calculates image depth information of a scene (e.g., object 106) based on indirect time-of-flight (e.g., iToF) measurements with an image sensor that includes a time-of-flight pixel array 110. In some examples, it is appreciated that although time-of-flight light sensing system 100 is capable of sensing 3D images, time-of-flight light system 100 may also be utilized to capture 2D images. In various examples, time-of-flight light sensing system 100 may also be utilized to capture high dynamic range (HDR) images.

As shown in the depicted example, time-of-flight light sensing system 100 includes light source 102 that is synchronized with a time-of-flight sensor that includes the time-of-flight pixel array 110, which includes a plurality of time-of-flight pixel circuits 112, and a control circuit 114 that is coupled to control and synchronize the time-of-flight pixel array 110 and light source 102.

As illustrated, light source 102 is configured to emit light 104 to the object 106 over a distance L. The emitted light 104 is then reflected from the object 106 as reflected light 108 (e.g., reflected light waves/pulses), some of which propagates towards the time-of-flight pixel array 110 of time-of-flight light sensing system 100 over the distance L and is incident upon the time-of-flight pixel circuits 112 of time-of-flight pixel array 110 as image light. Each time-of-flight pixel circuit 112 included in the time-of-flight pixel array 110 includes a photodetector (e.g., one or more photodiodes, avalanche photodiodes, or single-photon avalanche diodes, or the like) to detect the reflected light 108 and convert the reflected light 108 into an electric signal (e.g., electrons, image charge, etc.).

It is noted that time-of-flight pixel array 110 and control circuit 114 are represented as separate components in FIG. 1 for explanation purposes. However, it is appreciated that time-of-flight pixel array 110 and components of control circuit 114 may be integrated onto a same integrated circuit chip or wafer in a non-stacked standard planar sensor. In various examples, it is also appreciated that time-of-flight pixel array 110 may implemented in a stacked time-of-flight image sensor.

Continuing with the depicted example, each time-of-flight pixel circuit 112 of time-of-flight pixel array 110 determines depth information for a corresponding portion of object 106 such that a 3D image of object 106 can be generated. As will be discussed in greater detail below, depth information is determined by modulating the transfer gates of each time-of-flight pixel circuit 112 with 0°/180° and 180°/0° phase modulation signals as well as with opposing 90°/270° and 270°/90° phase modulation signals in multiple subframes to measure the delay/phase difference between emitted light 104 and the received reflected light 108 to indirectly determine a round-trip time for light to propagate from light source 102 to object 106 and back to the time-of-flight pixel array 110 of time-of-flight light sensing system 100. In the various example, the 0°, 90°, 180°, and 270° phase modulation signals are also modulated at multiple different frequencies in the multiple subframes. In various examples, each of a plurality of memory nodes included in each time-of-flight pixel circuit 112 is capable of capturing and storing a subframe of a portion of charge information from the photodiode included in the time-of-flight pixel circuit 112 during or prior to a readout of another memory node storing another subframe of a portion of charge information acquired in a previous subframe. Thus, the depth information may be based on electric signals generated by the photodiode included in each time-of-flight pixel circuit 112, which are subsequently transferred and stored in the plurality of memory nodes in each time-of-flight pixel circuit 112, which are then read out subsequently.

As shown in the depicted example, the round-trip time for emitted light 104 to propagate from light source 102 to object 106 and then be reflected back to time-of-flight pixel array 110 can be used to determine the distance L using the following relationships in Equations (1) and (2) below:

$$T_{TOF} = \frac{2L}{c} \qquad (1)$$

$$L = \frac{T_{TOF} \cdot c}{2} \qquad (2)$$

where c is the speed of light, which is approximately equal to $3 \times 10^8$ m/s, and $T_{TOF}$ corresponds to the round-trip time, which is the amount of time that it takes for the light to travel to and from the object 106 as shown in FIG. 1. Accordingly, once the round-trip time is known, the distance L may be calculated and subsequently used to determine depth information of object 106.

As shown in the depicted example, control circuit 114 is coupled to time-of-flight pixel array 110 and light source 102, and includes logic and memory that when executed causes time-of-flight light sensing system 100 to perform operations for determining the round-trip time. Determining the round-trip time may be based on, at least in part, timing signals generated by control circuit 114. For indirect time-of-flight (indirect time-of-flight) measurements, the timing signals are representative of the delay/phase difference between the light waves/pulses of when the light source 102 emits light 104 and when the photodetectors in time-of-flight pixel circuits 112 detect the reflected light 108.

In some examples, time-of-flight light sensing system 100 may be included in a device (e.g., a mobile phone, a tablet, a camera, etc.) that has size and power constraints determined, at least in part, based on the size of the device. Alternatively, or in addition, time-of-flight light sensing system 100 may have specific desired device parameters such as frame rate, depth resolution, lateral resolution, etc.

Figure 2:
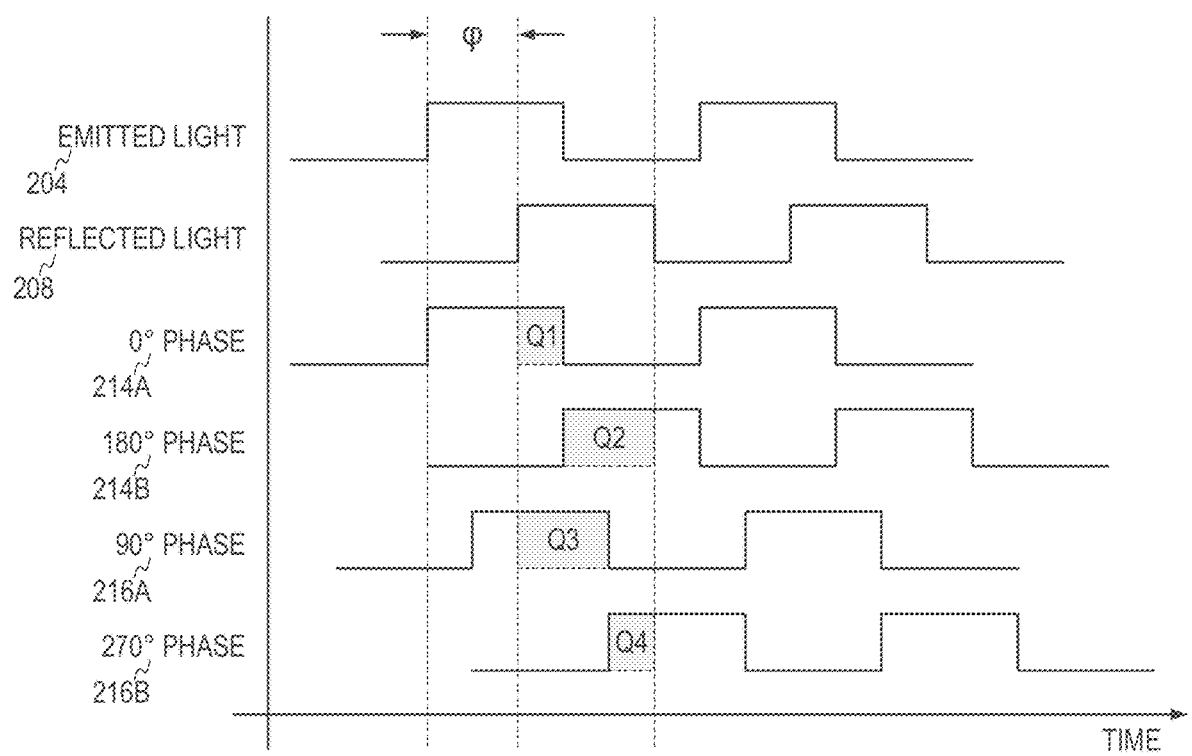
FIG. 2 is a timing diagram that shows an example of light pulses emitted from a light source relative to the receipt of the reflected light pulses and measurements using various phase shifts in an example time-of-flight sensing system accordance with the teachings of the present invention.

FIG. 2 is a timing diagram that illustrates the timing relationship between example light pulses emitted from a light source relative to the receipt of the reflected light pulses and measurements using various phase shifts in an example time-of-flight imaging system accordance with the teachings of the present invention. Specifically, FIG. 2 shows emitted light 204, which represents the modulated light pulses that are emitted from the light source 102 to the object 106, and corresponding pulses reflected light 208, which represents the reflected light pulses that are back-reflected from the object 106 and received by the time-of-flight pixel circuits 112 of time-of-flight pixel array 110 of FIG. 1.

The example depicted in FIG. 2 also illustrates measurement pulses of the phase modulation signals including a 0° phase modulation signal 214A (e.g., a first phase modulation signal) and a 180° phase modulation signal 214B (e.g., a second phase modulation signal), as well as measurement pulses including a 90° phase modulation signal 216A (e.g., a third phase modulation signal) and a 270° phase modulation signal 216B (e.g., a fourth phase modulation signal), which as shown are all phase-shifted relative to the phase of the pulses of emitted light 204. In addition, it is appreciated that in the depicted example the 180° phase modulation signal 214B is an inverted 0° phase modulation signal 214A, that the 90° phase modulation signal 216A is ninety degrees out of phase with the 0° phase modulation signal 214A, and that the 270° phase modulation signal 216B is an inverted 90° phase modulation signal 216A.

FIG. 2 also shows that the 0° phase modulation signal 214A and 180° phase modulation signal 214B as well as the 90° phase modulation signal 216A and 270° phase modulation signal 216B pulses are all modulated at the same frequency as the modulated emitted light 204 and reflected light 208 to realize homodyne detection of the reflected light 208 in accordance with the teachings of the present invention. In various examples, the modulation frequency of the phase modulation signals and the modulated emitted light may be varied across the multiple subframes in which the phase is measured. It is appreciated that the measurements at additional frequencies and/or phases can improve systematic errors, such as for example harmonic distortions and/or multipath artifacts. Utilizing the different phases for the example measurement pulses as shown allows reconstruction of the encoded distance in multiple subframes in accordance with the teachings of the present invention.

As will be discussed, the 0° phase modulation signal 214A and 180° phase modulation signal 214B as well as the 90° phase modulation signal 216A and 270° phase modulation signal 216B pulses correspond to the switching or modulation of transfer transistors that are included in the time-of-flight pixel circuits 112 of time-of-flight pixel array 110. In operation, the modulation of the transfer transistors in the time-of-flight pixel circuits 112 of time-of-flight pixel array 110 can be used to measure the charge that is photogenerated in the one or more photodiodes that are included in the time-of-flight pixel circuits 112 in response to the reflected light 208 to measure the delay or phase difference φ between the pulses of emitted light 204 and the corresponding pulses of reflected light 208.

For instance, the example illustrated in FIG. 2 shows that a first portion of charge Q1 is photogenerated by the pulses of 0° phase modulation signal 214A and that a second portion of charge Q2 is photogenerated by the pulses of 180° phase modulation signal 214B in response to reflected light 208. Similarly, a third portion of charge Q3 is photogenerated by the pulses of 90° phase modulation signal 216A and a fourth portion of charge Q4 is photogenerated by the pulses of 270° phase modulation signal 216B in response to reflected light 208. As will be discussed in greater detail below, the measurements of four phase portions of charge Q1, Q2, Q3, and Q4 can then be used to determine the delay or phase difference φ between the emitted light 204 and the reflected light 208, and therefore the time of flight $T_{TOF}$ of light from the light source 102 to the object 106 and then back to the time-of-flight pixel array 110 in accordance with the teachings of the present invention.

Figure 3:
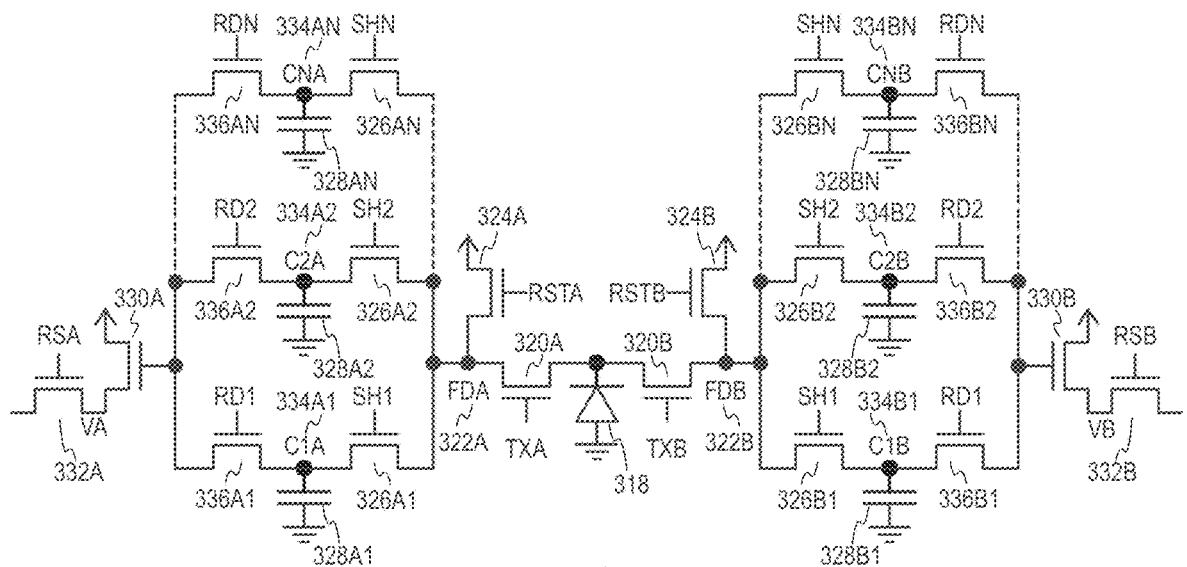
FIG. 3 is a schematic illustrating one example of a time-of-flight pixel circuit in accordance with the teachings of the present invention.

FIG. 3 is a schematic illustrating one example of a time-of-flight pixel circuit 312 in accordance with the teachings of the present invention. It is appreciated that the time-of-flight pixel circuit 312 of FIG. 3 may be an example of one of the time-of-flight pixel circuits 112 included in time-of-flight pixel array 110 shown in FIG. 1, and that similarly named and numbered elements described above are coupled and function similarly below.

As shown in the example depicted in FIG. 3, the time-of-flight pixel circuit 312 includes a photodiode 318 configured to photogenerate charge in response to incident light. In one example, the light that is incident on photodiode 318 is the reflected modulated light 108 that is reflected from an object 106 as described in FIG. 1. A first floating diffusion FDA 322A is configured to store a first portion of charge photogenerated in the photodiode 318, and second floating diffusion FDB 322B is configured to store a second portion of charge photogenerated in the photodiode 318. In one example, a first reset transistor 324A is coupled between a supply rail and the first floating diffusion FDA 322A. A second reset transistor 324B is coupled between the supply rail and the second floating diffusion FDB 322B. In the various examples, the first reset transistor 334A is configured to reset the first floating diffusion FDA 322A in response to a first reset signal RSTA and the second reset transistor 334B is configured to reset the second floating diffusion FDB 322B in response to a second reset signal RSTB. In various examples, the first reset signal RSTA and second reset signal RSTB may be the same signal or different signals. In one example, the first reset transistor 334A and second reset transistor 334B may also act as overflow transistors. In such examples, the first reset transistor 334A and second reset transistor 334B may be operated in such a way that excess carriers generated by photodiode 318 may be guided to the power supply by first reset transistor 334A and/or the second reset transistor 334B or in a way such that the photosensitivity of photodiode 318 is disabled.

A first transfer transistor 320A is configured to transfer the first portion of charge from the photodiode 318 to the first floating diffusion FDA 322A in response to a first modulation signal TXA. In one example, the first modulation signal TXA may be an example of one of the phase modulation signals described in FIG. 2. A second transfer transistor 320B is configured to transfer the second portion of charge from the photodiode 318 to the second floating diffusion FDB 322B in response to a second modulation signal TXB. In the example, the second modulation signal TXB may also be an example of one of the phase modulation signals described in FIG. 2.

As shown in the depicted example, the time-of-flight pixel circuit 312 also includes a first plurality of N capacitors 328A1, 328A2, . . . , 328AN, which provide a first plurality of N memory nodes C1A 334A1, C2A 334A2, . . . , CNA 334AN, and a second plurality of N capacitors 328B1, 328B2, . . . , 328BN, which provide a second plurality of N memory nodes C1B 334B1, CBA 334B2, . . . , CNA 334BN. In the example, each one of a first plurality of N sample and hold transistors 326A1, 326A2, . . . , 326AN is coupled between the first floating diffusion FDA 322A and a respective one of the first plurality of N memory nodes C1A 334A1, C2A 334A2, . . . , CNA 334AN as shown. Similarly, each one of a second plurality of N sample and hold transistors 326B1, 326B2, . . . , 326BN is coupled between the second floating diffusion FDB 322B and a respective one of the second plurality of N memory nodes C1B 334B1, C2A 334B2, . . . , CNA 334BN as shown.

As shown in the depicted example, the time-of-flight pixel circuit 312 further includes a first output source follower transistor 330A and a second output source follower transistor 330B. Each one of a first plurality of N readout transistors 336A1, 336A2, . . . , 336AN is coupled between a respective one of the first plurality of N memory nodes C1A 334A1, C2A 334A2, . . . , CNA 334AN and a gate of the first output source follower transistor 330A. Each one of a second plurality of N readout transistors 336B1, 336B2, . . . , 336BN is coupled between a respective one of the second plurality of N memory nodes C1B 334B1, CBA 334B2, . . . , CNA 334BN and a gate of the second output source follower transistor 330A. A first row select transistor 332A is coupled to each one of the first plurality of N readout transistors 336A1, 336A2, . . . , 336AN and a second row select transistor 332B is coupled to each one of the second plurality of N readout transistors 336B1, 336B2, . . . , 336BN. In one example, the output of the first row select transistor 332A may be considered a first tap of the time-of-flight pixel circuit 312 from which the output VA from first output source follower transistor 330A may be read out, and the output of the second row select transistors may be considered a second tap of the time-of-flight pixel circuit 312 from which the output VB from second output source follower transistor 330B may be read out.

In one example, the time-of-flight pixel circuit 312 may be configured as a pipelined pixel circuit such that there are two memory nodes (e.g., N=2) per output tap. To illustrate, in a pipelined pixel circuit example with N=2, there are two memory nodes (e.g., 334A1/334A2, 334B1/334B2), two sample and hold transistors (e.g., 326A1/326A2, 326B1/326B2), and two readout transistors (e.g., 336A1/336A2, 336B1/336B2) per output tap. In the example pipelined pixel circuit configuration, one of the memory nodes per output tap can be coupled to the respective floating diffusion through a respective sample and hold transistor to acquire and store (e.g., sample and hold) the portion of charge from the floating diffusion, while the other memory node is read out with the other memory node being coupled to the gate terminal of the respective output source follower transistor through a respective readout transistor.

In another example, the time-of-flight pixel circuit 312 may be configured as a burst pixel circuit with two or more memory nodes per output tap (e.g., N=4 or N=8). In a burst pixel circuit configuration, the depth of frame may be formed with, for example, N=4 or N=8 subframes with N=4 or N=8 memory nodes per output tap, which allows the required analog to digital converter (ADC) readout speed, chip-size, and power consumption requirements to be reduced drastically in accordance with the teachings of the present invention. In operation, all of the memory nodes (e.g., 334A1/334B1, 334A2/334B2, . . . , 334AN/334BN) are coupled to sample and hold the first and second portions of the charge from the respective floating diffusions (e.g., 322A/322B) through the respective sample and hold transistors (e.g., 326A1/326B1, 326A2/326B2, . . . , 326AN/326BN).

In one example, the first and second portions of the charge from the respective first and second floating diffusions (e.g., 322A/322B) each include a plurality of subframe portions of the first and second portions of charge. In the various examples, each one of the respective subframe portions of charge is transferred into the respective first and second floating diffusions (e.g., 322A/322B) in response to the first and second modulation signals TXA and TXB having a specific phase (e.g., 0°/180°, 90°/270°, 180°/0°, 270°/90°) as well as a specific frequency setting (e.g., f1, f2) combination for each subframe. In the various examples, each one of the plurality of subframe portions of the first and second portions of charge in the respective floating diffusion (e.g., 322A/322B) is configured to be sampled and held in sequence (e.g., one after another in time) into a respective one of the memory nodes (e.g., 334A1/334B1, 334A2/ 334B2, . . . , 334AN/334BN) through a respective one of the sample and hold transistors (e.g., 326A1/326B1, 326A2/ 326B2, . . . , 326AN/326BN).

After all of the memory nodes have received the plurality of subframe portions of the first and second portions of the charge from the respective floating diffusions, each one of the plurality of subframe portions of the first and second portions of the charge may then be read out from the memory nodes through the respective readout transistors (e.g., 336A1/336B1, 336A2/336B2, . . . , 336AN/336BN). In one example, each one of the plurality of subframe portions of the first and second portions of charge that is stored in the respective memory nodes (e.g., 334A1/334B1, 334A2/ 334B2, . . . , 334AN/334BN) is configured to be read out in sequence (e.g., one after another in time) through a respective one the first plurality of readout transistors (e.g., 336A1/ 336B1, 336A2/336B2, . . . , 336AN/336BN) after all of the memory nodes have sampled and held the plurality of subframe portions of the first and second portions of the charge from the first and second floating diffusions (e.g., 332A/332B).

It is appreciated that burst pixel circuit configurations may be utilized in situations where readout speeds are too slow for pipelined pixel circuit configurations. For instance, in an example with N=8, 8 subframes of phase charge information may be sampled and held in 8 memory nodes in sequence. After the 8 subframes of phase charge information have been stored in the respective 8 memory nodes, the 8 memory nodes may then be subsequently read out in sequence with reduced readout speed requirements after the integration period as there is typically a gap between integration exposure periods.

In the various examples, the first modulation signal TXA and second modulation signal TXB are configured to modulate the first transfer transistor 320A and the second transfer transistor 320B. In the examples, the first modulation signal TXA and second modulation signal TXB are modulation signals that are 180° out of phase or inverted versions of each other during the multiple subframes in which the time-of-flight pixel circuit 312 is modulated. For instance, in one example, in a first subframe, the first modulation signal TXA may be the 0° phase modulation signal 214A while the second modulation signal TXB is therefore the 180° phase modulation signal 214B. In that example, in another subframe, the first modulation signal TXA and the second modulation signal TXB are inverted relative to their respective signals in the first subframe. In other words, in that example, in the other subframe, the first modulation signal TXA is the 180° phase modulation signal 216B while the second modulation signal TXB is the 0° phase modulation signal 214A. In the various examples, it is appreciated that the first and second transfer transistors 320A and 320B may also be modulated with 90°/270° phase modulation signals as well as with the opposing phases of 270°/90° phase modulation signals in multiple subframes.

By modulating the first transfer transistor 320A and the second transfer transistor 320B with the first modulation signal TXA and second modulation signal TXB with the opposing phases of the 0°/180° and 180°/0° phase modulation signals as well as with the opposing phases of the 90°/270° and 270°/90° phase modulation signals in the multiple subframes as described, offset errors as well as dark current errors in the time-of-flight pixel circuits are canceled or removed in accordance with the teachings of the present invention.

In the various examples, the first modulation signal TXA and second modulation signal TXB may also be modulated at different frequencies in different subframes, which improves systematic errors, such as for example harmonic distortions or multipath artifacts in accordance with the teachings of the present invention. For instance, in one example, the first modulation signal TXA and second modulation signal TXB are configured to alternate between two different modulation frequencies f1 and f2 for each subframe. In other words, in one example, the first modulation signal TXA and second modulation signal TXB are configured to be modulated at a modulation frequency f1 during a first subframe, and then a modulation frequency f2 during a second subframe. Then, in a third subframe, the first modulation signal TXA and second modulation signal TXB are configured to be modulated at the modulation frequency f1, and then in a fourth subframe, the first modulation signal TXA and second modulation signal TXB are configured to be modulated at the modulation frequency f2, and so on.

To illustrate, a detailed example is described below in which offset errors and dark current errors are canceled or removed by modulating the first transfer transistor 320A and the second transfer transistor 320B with opposing 0°/180° and 180°/0° phase modulation signals as well as with 90°/270° and 270°/90° phase modulation signals over multiple subframes in an example time-of-flight pixel circuit 312 configured as pipelined pixel circuit such that there are two memory nodes (e.g., N=2) per output tap. In the example, the following relationships regarding time-of-flight pixel circuit 312 are given. In the example, it is appreciated that systematic errors, such as for example harmonic distortions or multipath artifacts, are also reduced by alternating the modulation frequencies between a first modulation frequency f1 and a second modulation frequency f2 for each subframe. It is also noted that a timing diagram illustrating the example described below is provided in FIG. 6.

$$V_{SF1\text{-}A}=V_A=o_A+CG_{A1}\cdot(Q_{0\text{-}f1}+DC_A) \qquad (3)$$

In Equation (3), $V_{SF1\text{-}A}$ represents the voltage $V_A$ at the output tap on the left side of time-of-flight pixel circuit 312 during a first subframe SF1, $o_A$ represents the offset error associated with the output tap on the left side of time-of-flight pixel circuit 312, $CG_{A1}$ represents the conversion gain associated with memory node C1A 334A1 of time-of-flight pixel circuit 312, $Q_{0\text{-}f1}$ represents the 0° portion of charge (e.g., Q1) measured at a first modulation frequency f1, and $DC_A$ represents the dark current error associated with the output tap on the left side of time-of-flight pixel circuit 312.

$$V_{SF1\text{-}B}=V_B=o_B+CG_{B1}\cdot(Q_{180\text{-}f1}+DC_B) \qquad (4)$$

In Equation (4), $V_{SF1\text{-}B}$ represents the voltage $V_B$ at the output tap on the right side of time-of-flight pixel circuit 312 during the first subframe SF1, $o_B$ represents the offset error associated with the output tap on the right side of time-of-flight pixel circuit 312, $CG_{B1}$ represents the conversion gain associated with memory node C1B 334B1 of time-of-flight pixel circuit 312, $Q_{180\text{-}f1}$ represents the 180° portion of charge (e.g., Q2) measured at the first modulation frequency f1, and $DC_B$ represents the dark current error associated with the output tap on the right side of time-of-flight pixel circuit 312.

$$V_{SF2\text{-}A}=V_A=o_A+CG_{A1}\cdot(Q_{0\text{-}f2}+DC_A) \qquad (5)$$

In Equation (5), $V_{SF2\text{-}A}$ represents the voltage $V_A$ at the output tap on the left side of time-of-flight pixel circuit 312 during a second subframe SF2, $o_A$ represents the offset error associated with the output tap on the left side of time-of-flight pixel circuit 312, $CG_{A1}$ represents the conversion gain associated with memory node C1A 334A1 of time-of-flight pixel circuit 312, $Q_{0\text{-}f2}$ represents the 0° portion of charge (e.g., Q1) measured at a second modulation frequency f2, and $DC_A$ represents the dark current error associated with the output tap on the left side of time-of-flight pixel circuit 312.

$$V_{SF2\text{-}B}=V_B=o_B+CG_{B1}\cdot(Q_{180\text{-}f2}+DC_B) \quad (6)$$

In Equation (6), $V_{SF2\text{-}B}$ represents the voltage $V_B$ at the output tap on the right side of time-of-flight pixel circuit 312 during the second subframe SF2, $o_B$ represents the offset error associated with the output tap on the right side of time-of-flight pixel circuit 312, $CG_{B1}$ represents the conversion gain associated with memory node C1B 334B1 of time-of-flight pixel circuit 312, $Q_{180\text{-}f2}$ represents the 180° portion of charge (e.g., Q2) measured at the second modulation frequency f2, and $DC_B$ represents the dark current error associated with the output tap on the right side of time-of-flight pixel circuit 312.

$$V_{SF3\text{-}A}=V_A=o_A+CG_{A2}\cdot(Q_{90\text{-}f1}+DC_A) \quad (7)$$

In Equation (7), $V_{SF3\text{-}A}$ represents the voltage $V_A$ at the output tap on the left side of time-of-flight pixel circuit 312 during a third subframe SF3, $o_A$ represents the offset error associated with the output tap on the left side of time-of-flight pixel circuit 312, $CG_{A2}$ represents the conversion gain associated with memory node C2A 334A2 of time-of-flight pixel circuit 312, $Q_{90\text{-}f1}$ represents the 90° portion of charge (e.g., Q3) measured at the first modulation frequency f1, and $DC_A$ represents the dark current error associated with the output tap on the left side of time-of-flight pixel circuit 312.

$$V_{SF3\text{-}B}=V_B=o_B+CG_{B2}\cdot(Q_{270\text{-}f1}+DC_B) \quad (8)$$

In Equation (8), $V_{SF3\text{-}B}$ represents the voltage $V_B$ at the output tap on the right side of time-of-flight pixel circuit 312 during the third subframe SF3, $o_B$ represents the offset error associated with the output tap on the right side of time-of-flight pixel circuit 312, $CG_{B2}$ represents the conversion gain associated with memory node C2B 334B2 of time-of-flight pixel circuit 312, $Q_{270\text{-}f1}$ represents the 270° portion of charge (e.g., Q4) measured at the first modulation frequency f1, and $DC_B$ represents the dark current error associated with the output tap on the right side of time-of-flight pixel circuit 312.

$$V_{SF4\text{-}A}=V_A=o_A+CG_{A2}\cdot(Q_{90\text{-}f2}+DC_A) \quad (9)$$

In Equation (9), $V_{SF4\text{-}A}$ represents the voltage $V_A$ at the output tap on the left side of time-of-flight pixel circuit 312 during a fourth subframe SF4, $o_A$ represents the offset error associated with the output tap on the left side of time-of-flight pixel circuit 312, $CG_{A2}$ represents the conversion gain associated with memory node C2A 334A2 of time-of-flight pixel circuit 312, $Q_{90\text{-}f2}$ represents the 90° portion of charge (e.g., Q3) measured at the second modulation frequency f2, and $DC_A$ represents the dark current error associated with the output tap on the left side of time-of-flight pixel circuit 312.

$$V_{SF4\text{-}B}=V_B=o_B+CG_{B2}\cdot(Q_{270\text{-}f2}+DC_B) \quad (10)$$

In Equation (10), $V_{SF4\text{-}B}$ represents the voltage VB at the output tap on the right side of time-of-flight pixel circuit 312 during the fourth subframe SF4, $o_B$ represents the offset error associated with the output tap on the right side of time-of-flight pixel circuit 312, $CG_{B2}$ represents the conversion gain associated with memory node C2B 334B2 of time-of-flight pixel circuit 312, $Q_{270\text{-}f2}$ represents the 270° portion of charge (e.g., Q4) measured at the second modulation frequency f2, and $DC_B$ represents the dark current error associated with the output tap on the right side of time-of-flight pixel circuit 312.

$$V_{SF5\text{-}A}=V_A=o_A+CG_{A1}\cdot(Q_{180\text{-}f1}+DC_A) \quad (11)$$

In Equation (11), $V_{SF5\text{-}A}$ represents the voltage $V_A$ at the output tap on the left side of time-of-flight pixel circuit 312 during a fifth subframe SF5, $o_A$ represents the offset error associated with the output tap on the left side of time-of-flight pixel circuit 312, $CG_{A1}$ represents the conversion gain associated with memory node C1A 334A1 of time-of-flight pixel circuit 312, $Q_{180\text{-}f1}$ represents the 180° portion of charge (e.g., Q2) measured at the first modulation frequency f1, and $DC_A$ represents the dark current error associated with the output tap on the left side of time-of-flight pixel circuit 312.

$$V_{SF5\text{-}B}=V_B=o_B+CG_{B1}\cdot(Q_{0\text{-}f1}+DC_B) \quad (12)$$

In Equation (12), $V_{SF5\text{-}B}$ represents the voltage $V_B$ at the output tap on the right side of time-of-flight pixel circuit 312 during the fifth subframe SF5, $o_B$ represents the offset error associated with the output tap on the right side of time-of-flight pixel circuit 312, $CG_{B1}$ represents the conversion gain associated with memory node C1B 334B1 of time-of-flight pixel circuit 312, $Q_{0\text{-}f1}$ represents the 0° portion of charge (e.g., Q1) measured at the first modulation frequency f1, and $DC_B$ represents the dark current error associated with the output tap on the right side of time-of-flight pixel circuit 312.

$$V_{SF6\text{-}A}=V_A=o_A+CG_{A1}\cdot(Q_{180\text{-}f2}+DC_A) \quad (13)$$

In Equation (13), $V_{SF6\text{-}A}$ represents the voltage $V_A$ at the output tap on the left side of time-of-flight pixel circuit 312 during a sixth subframe SF6, $o_A$ represents the offset error associated with the output tap on the left side of time-of-flight pixel circuit 312, $CG_{A1}$ represents the conversion gain associated with memory node C1A 334A1 of time-of-flight pixel circuit 312, $Q_{180\text{-}f2}$ represents the 180° portion of charge (e.g., Q2) measured at the second modulation frequency f2, and $DC_A$ represents the dark current error associated with the output tap on the left side of time-of-flight pixel circuit 312.

$$V_{SF6\text{-}B}=V_B=o_B+CG_{B1}\cdot(Q_{0\text{-}f2}+DC_B) \quad (14)$$

In Equation (14), $V_{SF6\text{-}B}$ represents the voltage $V_B$ at the output tap on the right side of time-of-flight pixel circuit 312 during the sixth subframe SF6, $o_B$ represents the offset error associated with the output tap on the right side of time-of-flight pixel circuit 312, $CG_{B1}$ represents the conversion gain associated with memory node C1B 334B1 of time-of-flight pixel circuit 312, $Q_{0\text{-}f2}$ represents the 0° portion of charge (e.g., Q1) measured at the second modulation frequency f2, and $DC_B$ represents the dark current error associated with the output tap on the right side of time-of-flight pixel circuit 312.

$$V_{SF7\text{-}A}=V_A=o_A+CG_{A2}\cdot(Q_{270\text{-}f1}+DC_A) \quad (15)$$

In Equation (15), $V_{SF7\text{-}A}$ represents the voltage $V_A$ at the output tap on the left side of time-of-flight pixel circuit 312 during a seventh subframe SF7, $o_A$ represents the offset error associated with the output tap on the left side of time-of-flight pixel circuit 312, $CG_{A2}$ represents the conversion gain associated with memory node C1A 334A2 of time-of-flight pixel circuit 312, $Q_{270\text{-}f1}$ represents the 270° portion of charge (e.g., Q4) measured at the first modulation frequency f1, and $DC_A$ represents the dark current error associated with the output tap on the left side of time-of-flight pixel circuit 312.

$$V_{SF7-B} = V_B = o_B + CG_{B2} \cdot (Q_{90-f1} + DC_B) \quad (16)$$

In Equation (16), $V_{SF7-B}$ represents the voltage $V_B$ at the output tap on the right side of time-of-flight pixel circuit 312 during the seventh subframe SF7, $o_B$ represents the offset error associated with the output tap on the right side of time-of-flight pixel circuit 312, $CG_{B2}$ represents the conversion gain associated with memory node C2B 334B2 of time-of-flight pixel circuit 312, $Q_{90-f1}$ represents the 90° portion of charge (e.g., Q3) measured at the first modulation frequency f1, and $DC_B$ represents the dark current error associated with the output tap on the right side of time-of-flight pixel circuit 312.

$$V_{SF8-A} = V_A = o_A + CG_{A2} \cdot (Q_{270-f2} + DC_A) \quad (17)$$

In Equation (17), $V_{SF8-A}$ represents the voltage $V_A$ at the output tap on the left side of time-of-flight pixel circuit 312 during an eighth subframe SF8, $o_A$ represents the offset error associated with the output tap on the left side of time-of-flight pixel circuit 312, $CG_{A2}$ represents the conversion gain associated with memory node C1A 334A2 of time-of-flight pixel circuit 312, $Q_{270-f2}$ represents the 270° portion of charge (e.g., Q4) measured at the second modulation frequency f2, and $DC_A$ represents the dark current error associated with the output tap on the left side of time-of-flight pixel circuit 312.

$$V_{SF8-B} = V_B = o_B + CG_{B2} \cdot (Q_{90-f2} + DC_B) \quad (18)$$

In Equation (18), $V_{SF8-B}$ represents the voltage VB at the output tap on the right side of time-of-flight pixel circuit 312 during the eighth subframe SF8, $o_B$ represents the offset error associated with the output tap on the right side of time-of-flight pixel circuit 312, $CG_{B2}$ represents the conversion gain associated with memory node C2B 334B2 of time-of-flight pixel circuit 312, $Q_{90-f2}$ represents the 90° portion of charge (e.g., Q3) measured at the second modulation frequency f2, and $DC_B$ represents the dark current error associated with the output tap on the right side of time-of-flight pixel circuit 312.

With regard to the first modulation frequency f1 relationships given in Equations (3), (4), (7), (8), (11), (12), (15), and (16) above, the phase $\varphi_{f1}$ measured at the first modulation frequency f1 from time-of-flight pixel array 312 can be determined according to Equation (19) as follows:

$$\varphi_{f1} = \frac{1}{2} \cdot \tan^{-1}\left(\frac{V_{SF5-A} - V_{SF1-A}}{V_{SF3-A} - V_{SF7-A}}\right) + \frac{1}{2} \cdot \tan^{-1}\left(\frac{V_{SF1-B} - V_{SF5-B}}{V_{SF7-B} - V_{SF3-B}}\right) \quad (19)$$

Similarly, with regard to the second modulation frequency f2 relationships given in Equations (5), (6), (9), (10), (13), (14), (17), and (18) above, the phase $\varphi_{f2}$ measured at the second modulation frequency f2 from time-of-flight pixel array 312 can be determined according to Equation (20) as follows:

$$\varphi_{f2} = \frac{1}{2} \cdot \tan^{-1}\left(\frac{V_{SF6-A} - V_{SF2-A}}{V_{SF4-A} - V_{SF8-A}}\right) + \frac{1}{2} \cdot \tan^{-1}\left(\frac{V_{SF2-B} - V_{SF6-B}}{V_{SF8-B} - V_{SF6-B}}\right) \quad (20)$$

With regard to the phase measurements at the first modulation frequency f1, substituting Equations (3), (4), (7), (8), (11), (12), (15), and (16) into Equation (19) results in:

$$\varphi_{f1} = \frac{1}{2} \cdot \tan^{-1}\left(\frac{(o_A + CG_{A1} \cdot (Q_{180-f1} + DC_A)) - (o_A + CG_{A1} \cdot (Q_{0-f1} + DC_A))}{(o_A + CG_{A2} \cdot (Q_{90-f1} + DC_A)) - (o_A + CG_{A2} \cdot (Q_{270-f1} + DC_A))}\right) + \quad (21)$$

$$\frac{1}{2} \cdot \tan^{-1}\left(\frac{(o_B + CG_{B1} \cdot (Q_{180-f1} + DC_B)) - (o_B + CG_{B1} \cdot (Q_{0-f1} + DC_B))}{(o_B + CG_{B2} \cdot (Q_{90-f1} + DC_B)) - (o_B + CG_{B2} \cdot (Q_{270-f1} + DC_B))}\right)$$

After expanding Equation (21) above, all of the offset error terms $(o_A - o_A)$, $(o_A - o_A)$, $(o_B - o_B)$, and $(o_B - o_B)$ cancel each other out. Similarly, all of the dark current error terms $(CG_{A1} \cdot DC_A) - (CG_{A1} \cdot DC_A)$, $(CG_{A2} \cdot DC_A) - (CG_{A2} \cdot DC_A)$, $(CG_{B1} \cdot DC_B) - (CG_{B1} \cdot DC_B)$, and $(CG_{B2} \cdot DC_B) - (CG_{B2} \cdot DC_B)$ cancel each other out.

After removing these canceled offset error terms $(o_A, o_B)$ and dark current error terms $(CG_{A1} \cdot DC_A, CG_{A2} \cdot DC_A, CG_{B1} \cdot DC_B, CG_{B2} \cdot DC_B)$ shown in Equation (21), the phase $\varphi_{f1}$ measured at the first modulation frequency f1 from time-of-flight pixel array 312 can be determined according to Equation (22) as follows:

$$\varphi_{f1} = \frac{1}{2} \cdot \tan^{-1}\left(\frac{CG_{A1}}{CG_{A2}} \cdot \frac{Q_{180-f1} - Q_{0-f1}}{Q_{90-f1} - Q_{270-f1}}\right) + \quad (22)$$

$$\frac{1}{2} \cdot \tan^{-1}\left(\frac{CG_{B1}}{CG_{B2}} \cdot \frac{Q_{180-f1} - Q_{0-f1}}{Q_{90-f1} - Q_{270-f1}}\right)$$

It is appreciated that after the offset errors and dark current errors have been removed or compensated for using the modulation signals with opposing phases in multiple subframes as discussed above, the terms $(CG_{A1}/CG_{A2})$ and $(CG_{B1}/CG_{B2})$ are remaining conversion gain errors. Assuming the relative conversion gain values $CG_{A1}$, $CG_{B1}$, $CG_{A2}$, and $CG_{B2}$ are acceptable, the remaining conversion gain error terms $(CG_{A1}/CG_{A2})$ and $(CG_{B1}/CG_{B2})$ can be tolerated.

Similarly, with regard to the phase measurements at the second modulation frequency f2, substituting Equations (5), (6), (9), (10), (13), (14), (17), and (18) into Equation (20) results in:

$$\varphi_{f2} = \frac{1}{2} \cdot \tan^{-1}\left(\frac{(o_A + CG_{A1} \cdot (Q_{180-f2} + DC_A)) - (o_A + CG_{A1} \cdot (Q_{0-f2} + DC_A))}{(o_A + CG_{A2} \cdot (Q_{90-f2} + DC_A)) - (o_A + CG_{A2} \cdot (Q_{270-f2} + DC_A))}\right) + \quad (23)$$

$$\frac{1}{2} \cdot \tan^{-1}\left(\frac{(o_B + CG_{B1} \cdot (Q_{180-f2} + DC_B)) - (o_B + CG_{B1} \cdot (Q_{0-f2} + DC_B))}{(o_B + CG_{B2} \cdot (Q_{90-f2} + DC_B)) - (o_B + CG_{B2} \cdot (Q_{270-f2} + DC_B))}\right)$$

After expanding Equation (23) above, all of the offset error terms $(o_A - o_A)$, $(o_A - o_A)$, $(o_B - o_B)$, and $(o_B - o_B)$ cancel each other out. Similarly, all of the dark current error terms $(CG_{A1} \cdot DC_A) - (CG_{A1} \cdot DC_A)$, $(CG_{A2} \cdot DC_A) - (CG_{A2} \cdot DC_A)$, $(CG_{B1} \cdot DC_B) - (CG_{B1} \cdot DC_B)$, and $(CG_{B2} \cdot DC_B) - (CG_{B2} \cdot DC_B)$ cancel each other out.

After removing these canceled offset error terms $(o_A, o_B)$ and dark current error terms $(CG_{A1} \cdot DC_A, CG_{A2} \cdot DC_A, CG_{B1} \cdot DC_B, CG_{B2} \cdot DC_B)$ shown in Equation (23), the phase $\varphi_{f2}$ measured at the first modulation frequency f1 from time-of-flight pixel array 312 can be determined according to Equation (24) as follows:

$$\varphi_{f2} = \frac{1}{2} \cdot \tan^{-1}\left(\frac{CG_{A1}}{CG_{A2}} \cdot \frac{Q_{180-f2} - Q_{0-f2}}{Q_{90-f2} - Q_{270-f2}}\right) + \tag{24}$$

$$\frac{1}{2} \cdot \tan^{-1}\left(\frac{CG_{B1}}{CG_{B2}} \cdot \frac{Q_{180-f2} - Q_{0-f2}}{Q_{90-f2} - Q_{270-f2}}\right)$$

It is appreciated that after the offset errors and dark current errors have been removed or compensated for using the modulation signals with opposing phases in multiple subframes as discussed above, the terms ($CG_{A1}/CG_{A2}$) and ($CG_{B1}/CG_{B2}$) are remaining conversion gain errors. Assuming the relative conversion gain values $CG_{A1}$, $CG_{B1}$, $CG_{A2}$, and $CG_{B2}$ are acceptable, the remaining conversion gain error terms ($CG_{A1}/CG_{A2}$) and ($CG_{B1}/CG_{B2}$) can be tolerated.

Figure 4:
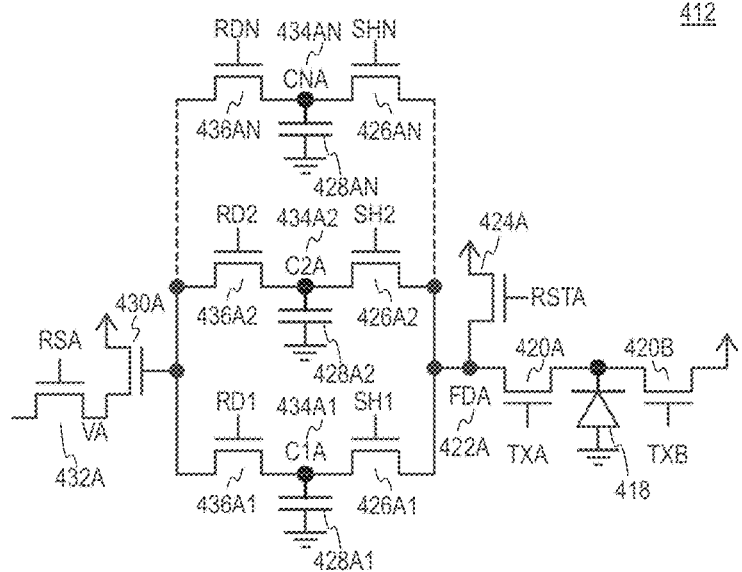
FIG. 4 is a schematic illustrating another example of a time-of-flight pixel circuit in accordance with the teachings of the present invention.

FIG. 4 is a schematic illustrating another example of a time-of-flight pixel circuit 412 in accordance with the teachings of the present invention. It is appreciated that the example of time-of-flight pixel circuit 412 illustrated in FIG. 4 shares many similarities with the time-of-flight pixel circuit 312 shown in FIG. 3, and/or may be an example of the time-of-flight pixel circuits 112 shown in FIG. 1, and that similarly named and numbered elements described above are coupled and function similarly below.

It is appreciated that one of the differences between the example of time-of-flight pixel circuit 412 illustrated in FIG. 4 and the example time-of-flight pixel circuit 312 shown in FIG. 3 is that example time-of-flight pixel circuit 412 of FIG. 4 has a single output tap per time-of-flight pixel circuit 412 instead of two output taps per time-of-flight pixel circuit 312 as shown in FIG. 3. In the example, the output VA may be read out from the one output tap on the left side of time-of-flight pixel circuit 412. As such, the example time-of-flight pixel circuit 412 illustrated in FIG. 4 is a simplified version of time-of-flight pixel circuit 312 of FIG. 3 and does not include a corresponding second floating diffusion FDB 322B, second reset transistor 324B, a second plurality of sample and hold transistors 326B1, 326B2, ..., 326BN, a second plurality of memory nodes C1B 334B1, C2B 334B2, ..., CNB 334BN, a second plurality of capacitors 328B1, 328B2, ..., 328BN, a second plurality of readout transistors 336B1, 336B2, ..., 336BN, a second output source follower transistor 330B, or a second row select transistor 332B compared to the example time-of-flight pixel circuit 312 depicted in FIG. 3.

Therefore, as illustrated in the example depicted in FIG. 4, example time-of-flight pixel circuit 412 includes a photodiode 418 configured to photogenerate charge in response to incident light. In one example, the light that is incident on photodiode 418 is the reflected modulated light 108 that is reflected from an object 106 as described in FIG. 1. The first floating diffusion FDA 422A is configured to store a first portion of charge photogenerated in the photodiode 418. In the example, a first reset transistor 424A is coupled between a supply rail and the first floating diffusion FDA 422A. In the various examples, the first reset transistor 424A is configured to reset the first floating diffusion FDA 422A in response to a first reset signal RSTA. In one example, the first reset transistor 424A may also act as an overflow transistor. In such an example, the first reset transistor 424A may be operated in such a way that excess carriers generated by photodiode 418 may be guided to the power supply by first reset transistor 424A or in a way such that the photosensitivity of photodiode 418 is disabled.

In the example, the first transfer transistor 420A is configured to transfer a first portion of charge from the photodiode 418 to the first floating diffusion FDA 422A in response to a first modulation signal TXA. In one example, the first modulation signal TXA may be an example of one of the phase modulation signals described in FIG. 2. A second transfer transistor 420B is configured to transfer a second portion of charge from the photodiode 418 in response to a second modulation signal TXB. In the example, the second modulation signal TXB may also be an example of one of the phase modulation signals described in FIG. 2.

As shown in the depicted example, time-of-flight pixel circuit 412 also includes a first plurality of N capacitors 428A1, 428A2, ..., 428AN, which provide a first plurality of N memory nodes C1A 434A1, C2A 434A2, ..., CNA 434AN. In the example, each one of a first plurality of N sample and hold transistors 426A1, 426A2, ..., 426AN is coupled between the first floating diffusion FDA 422A and a respective one of the first plurality of N memory nodes C1A 434A1, C2A 434A2, ..., CNA 434AN as shown.

As shown in the depicted example, time-of-flight pixel circuit 412 further includes a first output source follower transistor 430A. Each one of a first plurality of N readout transistors 436A1, 436A2, ..., 436AN is coupled between a respective one of the first plurality of N memory nodes C1A 434A1, C2A 434A2, ..., CNA 434AN and a gate of the first output source follower transistor 430A. A first row select transistor 432A is coupled to each one of the first plurality of N readout transistors 436A1, 436A2, ..., 436AN. In the example, the output of the first row select transistor 432A may be considered to be the single output tap of the time-of-flight pixel circuit 412 from which the output VA from first output source follower transistor 430A may be read out.

Similar to the example time-of-flight pixel circuit 312 of FIG. 3, the time-of-flight pixel circuit 412 of FIG. 4 also may be configured as a pipelined pixel circuit such that there are two memory nodes (e.g., N=2) coupled to the output tap. To illustrate, in a pipelined pixel example with N=2, there are two memory nodes (e.g., 434A1/434A2), two sample and hold transistors (e.g., 426A1/426A2), and two readout transistors (e.g., 436A1/436A2) coupled to the output tap. In the example pipelined pixel circuit configuration, one of the memory nodes can be coupled to the floating diffusion through a respective sample and hold transistor to acquire and store (e.g., sample and hold) the portion of charge from the floating diffusion, while the other memory node is read out with the other memory node being coupled to the gate terminal of the output source follower transistor through a respective readout transistor.

In another example, the time-of-flight pixel circuit 412 may be configured as a burst pixel circuit with two or more memory nodes coupled to output tap (e.g., N=4 or N=8). In a burst pixel circuit configuration, the depth of frame may be formed with, for example, N=4 or N=8 subframes with N=4 or N=8 memory nodes, which allows the required analog to digital converter (ADC) readout speed, chip-size, and power consumption requirements to be reduced drastically in accordance with the teachings of the present invention. In operation, all of the memory nodes (e.g., 434A1, 434A2, ..., 434AN) are coupled to sample and hold the portion of charge from the floating diffusion (e.g., 422A) through the respective sample and hold transistors (e.g., 426A1, 426A2, ..., 426AN).

After all of the memory nodes have received the portions of the charge from the floating diffusion, the portions of the charge may then be read out from the memory nodes through the respective readout transistors (e.g., 436A1, 436A2, ..., 436AN). It is appreciated that burst pixel circuit configurations may be utilized in situations where readout speeds are too slow for pipelined pixel circuit configurations. For instance, in an example with N=8, 8 subframes of phase charge information may be sampled and held in 8 memory nodes. After the 8 subframes of phase charge information have been stored in the respective 8 memory nodes, the 8 memory nodes may then be subsequently read out with reduced readout speed requirements after the integration period as there is typically a gap between integration exposure periods.

In one example, the portions of the charge from the floating diffusion 422A include a plurality of subframe portions. In the example, each of the plurality of subframe portions of charge is transferred into the floating diffusion 422A in response to the first modulation signal TXA having a specific phase (e.g., 0°, 90°, 180°, 270°) as well as a specific frequency setting (e.g., f1, f2) combination for each subframe. In the various examples, each one of the plurality of subframe portions is configured to be sampled and held in sequence (e.g., one after another in time) into a respective one of the memory nodes (e.g., 434A1, 434A2, ..., 434AN) from the floating diffusion 422A through a respective one of the sample and hold transistors (e.g., 426A1, 426A2, ..., 426AN).

After all of the memory nodes have received the plurality of subframe portions of the charge from the floating diffusion 422A, each one of the plurality of subframe portions of charge may then be read out from the memory nodes through the respective readout transistors (e.g., 436A1, 436A2, ..., 436AN). In one example, each of the plurality of subframe portions of the phase portions of charge that is stored in the memory nodes (e.g., 434A1, 434A2, ..., 434AN) is configured to be read out in sequence (e.g., one after another in time) through a respective one of the readout transistors (e.g., 436A1, 436A2, ..., 436AN) after all of the memory nodes have sampled and held the plurality of subframe portions of the phase portions of the charge from the floating diffusion (e.g., 422A).

In operation, the first modulation signal TXA and second modulation signal TXB are configured to modulate the first transfer transistor 420A and the second transfer transistor 420B. In the various examples, the first modulation signal TXA and second modulation signal TXB are modulation signals that are 180° out of phase or inverted versions of each other during the multiple subframes in which the time-of-flight pixel circuit 412 is modulated. For instance, in one example, in a first subframe, the first modulation signal TXA may be the 0° phase modulation signal 214A while the second modulation signal TXB is therefore the 180° phase modulation signal 214B. In that example, in another subframe, the first modulation signal TXA and the second modulation signal TXB are inverted relative to their respective signals in the first subframe. In other words, in that example, in the other subframe, the first modulation signal TXA is the 180° phase modulation signal 216B while the second modulation signal TXB is the 0° phase modulation signal 214A. In the various examples, it is appreciated that the first and second transfer transistors 420A and 420B may also be modulated with 90°/270° phase modulation signals as well as with the opposing phases of 270°/90° phase modulation signals in multiple subframes.

In the various examples, the first modulation signal TXA and second modulation signal TXB may also be modulated at different frequencies in different subframes, which improves systematic errors, such as for example harmonic distortions or multipath artifacts in accordance with the teachings of the present invention. For instance, in one example, the first modulation signal TXA and second modulation signal TXB are configured to alternate between two different modulation frequencies f1 and f2 for each subframe. In other words, in one example, the first modulation signal TXA and second modulation signal TXB are configured to be modulated at a modulation frequency f1 during a first subframe, and then a modulation frequency f2 during a second subframe. Then, in a third subframe, the first modulation signal TXA and second modulation signal TXB are configured to be modulated at the modulation frequency f1, and then in a fourth subframe, the first modulation signal TXA and second modulation signal TXB are configured to be modulated at the modulation frequency f2, and so on.

Similar to the time-of-flight pixel circuit 312 example depicted in FIG. 3, by modulating the first transfer transistor 420A and the second transfer transistor 420B with the first modulation signal TXA and second modulation signal TXB with the opposing phases of the 0°/180° and 180°/0° phase modulation signals as well as with the opposing phases of the 90°/270° and 270°/90° phase modulation signals in the multiple subframes as described, offset errors as well as dark current errors in the time-of-flight pixel circuits are canceled or removed in accordance with the teachings of the present invention.

To illustrate, an example is described below in which N=2 and offset errors and dark current errors are canceled or removed by modulating the first transfer transistor 420A and the second transfer transistor 420B with opposing 0°/180° and 180°/0° phase modulation signals as well as with 90°/270° and 270°/90° phase modulation signals over multiple subframes. In the example, the following relationships regarding time-of-flight pixel circuit 412 are given.

$$V_{SF1-A} = V_A = o_A + CG_{A1} \cdot (Q_0 + DC_A) \tag{25}$$

In Equation (25), $V_{SF1-A}$ represents the voltage $V_A$ at the output tap of time-of-flight pixel circuit 412 during a first subframe SF1, $o_A$ represents the offset error associated with the output tap of time-of-flight pixel circuit 412, $CG_{A1}$ represents the conversion gain associated with memory node C1A 434A1 of time-of-flight pixel circuit 412. $Q_0$ represents the 0° portion of charge (e.g., Q1), and $DC_A$ represents the dark current error associated with the output tap of pixel circuit 412.

$$V_{SF2-A} = V_A = o_A + CG_{A2} \cdot (Q_{90} + DC_A) \tag{26}$$

In Equation (26), $V_{SF2-A}$ represents the voltage $V_A$ at the output tap of time-of-flight pixel circuit 412 during a second subframe SF2, $o_A$ represents the offset error associated with the output tap of time-of-flight pixel circuit 412, $CG_{A2}$ represents the conversion gain associated with memory node C2A 434A2 of time-of-flight pixel circuit 412, $Q_{90}$ represents the 90° portion of charge (e.g., Q3), and $DC_A$ represents the dark current error associated with the output tap of time-of-flight pixel circuit 412.

$$V_{SF3-A} = V_A = o_A + CG_{A1} \cdot (Q_{180} + DC_A) \tag{27}$$

In Equation (27), $V_{SF3-A}$ represents the voltage $V_A$ at the output tap of time-of-flight pixel circuit 412 during a third subframe SF3, $o_A$ represents the offset error associated with the output tap of time-of-flight pixel circuit 412, $CG_{A1}$ represents the conversion gain associated with memory node C1A 434A1 of time-of-flight pixel circuit 412, $Q_{180}$ represents the 180° portion of charge (e.g., Q2), and $DC_A$ represents the dark current error associated with the output tap of time-of-flight pixel circuit 412.

$$V_{SF4-A} = V_A = o_A + CG_{A2} \cdot (Q_{270} + DC_A) \tag{28}$$

In Equation (28), $V_{SF4-A}$ represents the voltage $V_A$ at the output tap of time-of-flight pixel circuit 412 during a fourth subframe SF4, $o_A$ represents the offset error associated with the output tap of time-of-flight pixel circuit 412, $CG_{A2}$ represents the conversion gain associated with memory node C2A 434A2 of time-of-flight pixel circuit 412, $Q_{270}$ represents the 270° portion of charge (e.g., Q4), and $DC_A$ represents the dark current error associated with the output tap on the right side of time-of-flight pixel circuit 412.

With the relationships given in Equations (25)-(28), the measured phase φ from pixel circuit 412 can be determined as follows:

$$\varphi = \frac{1}{2} \cdot \tan^{-1}\left(\frac{V_{SF3-A} - V_{SF1-A}}{V_{SF2-A} - V_{SF4-A}}\right) \quad (29)$$

Substituting Equations (27), (25), (26), and (28) into Equation (29) results in the following equation to determine the measured phase φ from pixel circuit 412:

$$\varphi = \frac{1}{2} \cdot \tan^{-1}\left(\frac{(o_A + CG_{A1} \cdot (Q_{180} + DC_A)) - (o_A + CG_{A1} \cdot (Q_0 + DC_A))}{(o_A + CG_{A2} \cdot (Q_{90} + DC_A)) - (o_A + CG_{A2} \cdot (Q_{270} + DC_A))}\right) \quad (30)$$

After expanding Equation (30) above, the offset error terms $(o_A-o_A)$, $(o_A-o_A)$ cancel each other out. Similarly, the dark current error terms $(CG_{A1} \cdot DC_A)-(CG_{A1} \cdot DC_A)$, $(CG_{A2} \cdot DC_A)-(CG_{A2} \cdot DC_A)$ cancel each other out.

After removing these canceled offset error terms $(o_A)$ and dark current error terms $(CG_{A1} \cdot DC_A, CG_{A2} \cdot DC_A)$ shown in Equation (30), the measured phase φ from pixel circuit 412 can be determined according to Equation (31) as follows:

$$\varphi = \frac{1}{2} \cdot \tan^{-1}\left(\frac{CG_{A1}}{CG_{A2}} \cdot \frac{Q_{180} - Q_0}{Q_{90} - Q_{270}}\right) \quad (31)$$

It is appreciated that after the offset errors and dark current errors have been removed or compensated for using the modulation signals with opposing phases in multiple subframes as discussed above, the term $(CG_{A1}/CG_{A2})$ is the remaining conversion gain error. Assuming the relative conversion gain values $CG_{A1}$ and $CG_{A2}$ are acceptable, the remaining conversion gain error term $(CG_{A1}/CG_{A2})$ can be tolerated.

Figure 5:
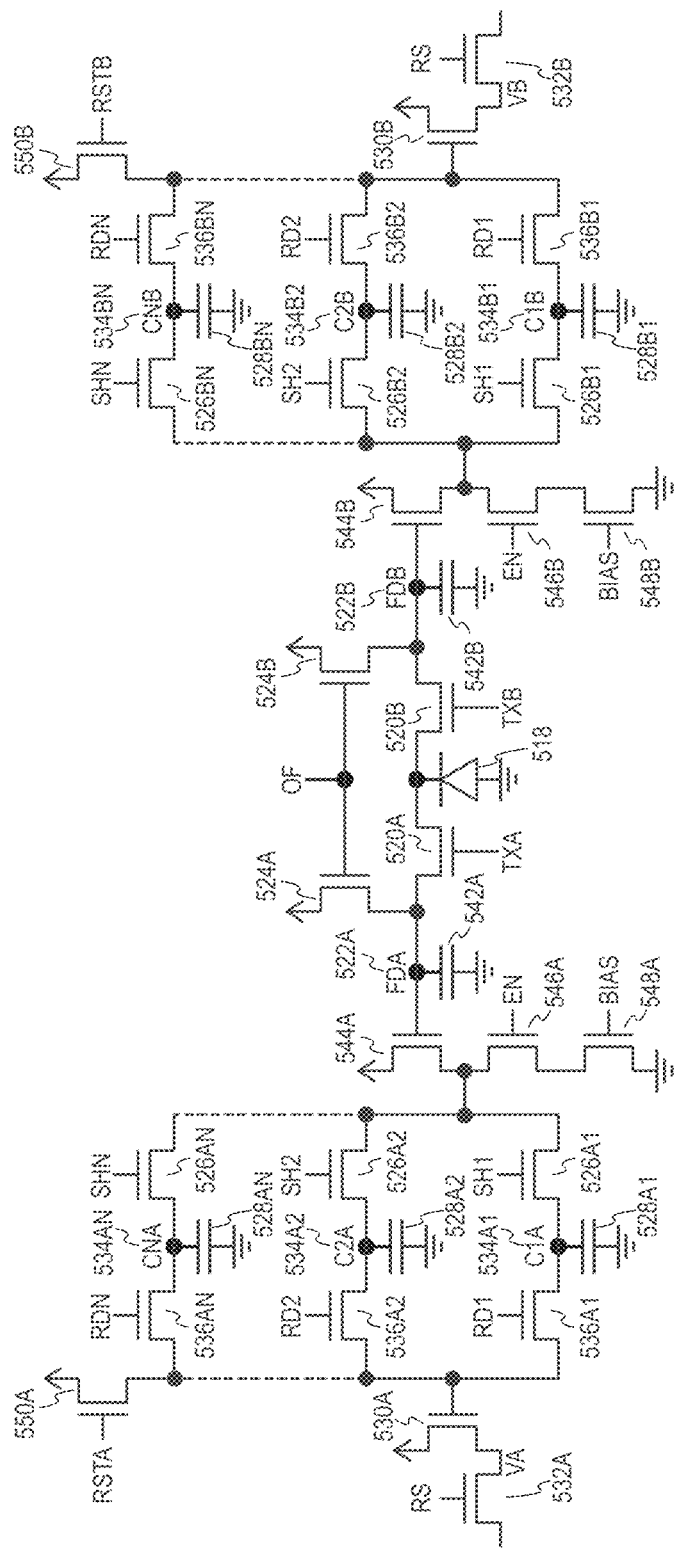
FIG. 5 is a schematic illustrating yet another example of a time-of-flight pixel circuit in accordance with the teachings of the present invention.

FIG. 5 is a schematic illustrating yet another example of a time-of-flight pixel circuit 512 in accordance with the teachings of the present invention. It is appreciated that the example of time-of-flight pixel circuit 512 illustrated in FIG. 5 shares many similarities with the time-of-flight pixel circuit 312 shown in FIG. 3, and/or may be an example of the time-of-flight pixel circuits 112 shown in FIG. 1, and that similarly named and numbered elements described above are coupled and function similarly below.

As will be shown, some of the differences between the example of time-of-flight pixel circuit 512 illustrated in FIG. 5 and the example time-of-flight pixel circuit 312 shown in FIG. 3 is that example time-of-flight pixel circuit 512 of FIG. 5 also includes optional additional amplifying stages that may be included between the floating diffusion nodes and the sample and hold transistors. In the example, additional capacitors may also be coupled to the floating diffusion nodes. Furthermore, optional output reset transistors may also be coupled to the gate terminals of the output source follower transistors that are coupled to the outputs of the readout transistors.

To illustrate, FIG. 5 shows that time-of-flight pixel circuit 512 includes a photodiode 518 configured to photogenerate charge in response to incident light. In one example, the light that is incident on photodiode 518 is the reflected modulated light 108 that is reflected from an object 106 as described in FIG. 1. In the example depicted in FIG. 5, a first floating diffusion capacitor 542A is coupled to the first floating diffusion FDA 522A and a second floating diffusion capacitor 542B coupled to second floating diffusion 522B as shown. The first floating diffusion FDA 522A and first floating diffusion capacitor 542A are configured to store a first portion of charge photogenerated in the photodiode 518, and the second floating diffusion FDB 522B and second floating diffusion capacitor 542B are configured to store a second portion of charge photogenerated in the photodiode 518. In one example, a first reset transistor 524A is coupled between a supply rail and the first floating diffusion FDA 522A and first floating diffusion capacitor 542A. A second reset transistor 524B is coupled between the supply rail and the second floating diffusion FDB 522B and second floating diffusion capacitor 542B. In the example depicted in FIG. 5, both the first and second reset transistors 524A and 524B are coupled to receive an overflow signal OF to function as overflow transistors. As such, the first reset transistor 534A and second reset transistor 534B may be operated in such a way that excess carriers generated by photodiode 518 may be guided to the power supply by first reset transistor 534A and/or the second reset transistor 534B or in a way such that the photosensitivity of photodiode 518 is disabled. Thus, in various examples, the overflow signal OF may be activated during periods in which integration does not occur.

A first transfer transistor 520A is configured to transfer the first portion of charge from the photodiode 518 to the first floating diffusion FDA 522A in response to a first modulation signal TXA. In one example, the first modulation signal TXA may be an example of one of the phase modulation signals described in FIG. 2. A second transfer transistor 520B is configured to transfer the second portion of charge from the photodiode 518 to the second floating diffusion FDB 522B in response to a second modulation signal TXB. In the example, the second modulation signal TXB may also be an example of one of the phase modulation signals described in FIG. 2.

As shown in the depicted example, the time-of-flight pixel circuit 512 also includes a first plurality of N capacitors 528A1, 528A2, ..., 528AN, which provide a first plurality of N memory nodes C1A 534A1, C2A 534A2, ..., CNA 534AN, and a second plurality of N capacitors 528B1, 528B2, ..., 528BN, which provide a second plurality of N memory nodes C1B 534B1, CBA 534B2, ..., CNA 534BN.

In the example depicted in FIG. 5, a first amplifying stage, including for example a first amplifying source follower transistor 544A, is coupled to the first floating diffusion FDA 522A and first floating diffusion capacitor 542A. As such, the gate of the first amplifying source follower transistor 544A is coupled to the first floating diffusion FDA 522A and first floating diffusion capacitor 542A while the source of first amplifying source follower transistor 544A is coupled to a first plurality of N sample and hold transistors 526A1, 526A2, ..., 526AN. Similarly, a second amplifying stage, including for example a second amplifying source follower transistor 544B, is coupled to the second floating diffusion FDB 522B and second floating diffusion capacitor 542B. As such, the gate of the second amplifying source follower transistor 544B is coupled to the second floating diffusion FDB 522A and second floating diffusion capacitor 542B while the source of second amplifying source follower transistor 544B is coupled to a second plurality of N sample and hold transistors 526B1, 526B2, . . . , 526BN.

In operation, it is appreciated that the first and second amplifying stages provided with first and second amplifying source follower transistors 544A and 544B function as decoupling stages between the respective floating diffusions FDA 522A and FDB 522B and the respective sample and hold transistors 526A1, 526A2, . . . , 526AN and 526B1, 526B2, . . . , 526BN. For instance, a pixel requires a large full-well capacity or charge handling capacity, which can be described with the product of C×V=Q. A conventional pipelined or burst mode pixel would require that each memory node C1A, C2A, . . . , CNA, C1B, C2B, . . . , CNB has the required C×V full-well capacity. The first and second amplifying source follower transistors 544A and 544B provide a voltage buffer/decoupling stage, which only requires the sense-node capacitances (e.g., capacitors 542A/542B) to be large. With the first and second amplifying source follower transistors 544A and 544B, the memory node capacitances C1A, C2A, . . . , CNA, C1B, C2B, . . . , CNB can now be reduced in size, which can help reducing pixel pitch (e.g., 500ke− to 50ke−). One drawback associated with this is additive kTC and flicker noise. However, for semiconductor materials such as for example Germanium or III/V technology, dark current noise dominates and the additional kTC noise is negligible. Furthermore, even for Silicon-based technology where dark current is negligible, often read-noise is not of importance for time-of-flight applications. Especially for outdoor applications, mostly photon shot noise is the limiting factor which could require a large FWC. Hence, also for Silicon, this decoupling technique provided with first and second amplifying source follower transistors 544A and 544B by can be helpful. This technique helps if one is either photon-shot noise limited or dark current shot noise limited.

In one example, an enable transistor 546A and a bias transistor 548A are coupled between the source of second amplifying source follower transistor 544B and ground, and an enable transistor 546B and a bias transistor 548B are coupled between the source of second amplifying source follower transistor 544B and ground. In the example, the gates of the enable transistors 546A and 546B are coupled to receive an enable signal EN, and the gates of the bias transistors 548A and 548B are coupled to receive a bias signal BIAS.

In the example, each one of the first plurality of N sample and hold transistors 526A1, 526A2, . . . , 526AN is coupled between first amplifying source follower transistor 544A, which is coupled to the first floating diffusion FDA 522A and first floating diffusion capacitor 542A, and a respective one of the first plurality of N memory nodes C1A 534A1, C2A 534A2, . . . , CNA 534AN as shown. Similarly, each one of a second plurality of N sample and hold transistors 526B1, 526B2, . . . , 526BN is coupled between the second amplifying source follower transistor 544B, which is coupled to the second floating diffusion FDB 522B and second floating diffusion capacitor 542B, and a respective one of the second plurality of N memory nodes C1B 534B1, C2A 534B2, . . . , CNA 534BN as shown.

As shown in the example depicted in FIG. 5, the time-of-flight pixel circuit 512 further includes a first output source follower transistor 530A and a second output source follower transistor 530B. In the depicted example, a first output reset transistor 550A is coupled between the gate of first output source follower transistor 530A and the voltage supply, and a second output reset transistor 550B is coupled between the gate of second output source follower transistor 530B and the voltage supply. In the example, the gate of the first output reset transistor 550A is coupled to receive a reset signal RSTA and the gate of the second output reset transistor 550B is coupled to receive a reset signal RSTB. In operation, the gates of the first and second output source follower transistors 530A and 530B can be reset or precharged by the first and second output reset transistors 550A and 550B between readouts to reduce noise by enabling for example correlated double sampling. In various examples, the reset signal RSTA and reset signal RSTB may be the same signal.

As shown in the depicted example, each one of a first plurality of N readout transistors 536A1, 536A2, . . . , 536AN is coupled between a respective one of the first plurality of N memory nodes C1A 534A1, C2A 534A2, . . . , CNA 534AN and the gate of the first output source follower transistor 530A. Each one of a second plurality of N readout transistors 536B1, 536B2, . . . , 536BN is coupled between a respective one of the second plurality of N memory nodes C1B 534B1, CBA 534B2, . . . , CNA 534BN and the gate of the second output source follower transistor 530B. A first row select transistor 532A is coupled to each one of the first plurality of N readout transistors 536A1, 536A2, . . . , 536AN and a second row select transistor 532B is coupled to each one of the second plurality of N readout transistors 536B1, 536B2, . . . , 536BN. In one example, the output of the first row select transistor 532A may be considered a first tap of the time-of-flight pixel circuit 512 from which the output VA from first output source follower transistor 530A may be read out, and the output of the second row select transistors may be considered a second tap of the time-of-flight pixel circuit 512 from which the output VB from second output source follower transistor 530B may be read out.

In one example, the time-of-flight pixel circuit 512 may be configured as a pipelined pixel circuit such that there are two memory nodes (e.g., N=2) per output tap. To illustrate, in a pipelined pixel circuit example with N=2, there are two memory nodes (e.g., 534A1/534A2, 534B1/534B2), two sample and hold transistors (e.g., 526A1/526A2, 526B1/526B2), and two readout transistors (e.g., 536A1/536A2, 536B1/536B2) per output tap. In the example pipelined pixel circuit configuration, one of the memory nodes per output tap can be coupled to the respective floating diffusion through a respective sample and hold transistor and through a respective amplifying source follower transistor to acquire and store (e.g., sample and hold) charge in response to the portion of charge from the floating diffusion, while the other memory node is read out with the other memory node being coupled to the gate terminal of the respective output source follower transistor through a respective readout transistor.

In another example, the time-of-flight pixel circuit 512 may be configured as a burst pixel circuit with two or more memory nodes per output tap (e.g., N=4 or N=8). In a burst pixel circuit configuration, the depth of frame may be formed with, for example, N=4 or N=8 subframes with N=4 or N=8 memory nodes per output tap, which allows the required analog to digital converter (ADC) readout speed, chip-size, and power consumption requirements to be reduced drastically in accordance with the teachings of the present invention. In operation, all of the memory nodes (e.g., 534A1/534B1, 534A2/534B2, . . . , 534AN/534BN) are coupled to sample and hold the first and second portions of the charge responsive to the charge from the respective floating diffusions (e.g., 522A/522B) from the respective amplifying stage through the respective sample and hold transistors (e.g., 526A1/526B1, 526A2/526B2, . . . , 526AN/526BN).

In one example, the first and second portions of the charge responsive to the charge in the respective first and second floating diffusions (e.g., 522A/522B) each include a plurality of subframe portions. In the example, each of the plurality of subframe portions of the first and second portions of charge is responsive to the first and second modulation signals TXA and TXB, which may be varied in phase and/or modulation frequency for each subframe. In the various examples, each of the plurality of subframe portions of the first and second portions of charge is configured to be sampled and held in sequence (e.g., one after another in time) into a respective one of the memory nodes (e.g., 534A1/534B1, 534A2/534B2, . . . , 534AN/534BN) responsive to the charge from the respective floating diffusion (e.g., 522A/522B) through a respective one of the sample and hold transistors (e.g., 526A1/526B1, 526A2/526B2, . . . , 526AN/526BN) and a respective one of the first and second amplifying source follower transistors 544A/544B.

After all of the memory nodes have received the respective subframe portion of the first and second portions of the charge, each one of the plurality of subframe portions of the first and second portions of the charge may then be read out from the memory nodes through the respective readout transistors (e.g., 536A1/536B1, 536A2/536B2, . . . , 536AN/536BN). In one example, each of the plurality of subframe portions of the first and second portions of charge that is stored in the respective memory nodes (e.g., 534A1/534B1, 534A2/534B2, . . . , 534AN/534BN) is configured to be read out in sequence (e.g., one after another in time) through a respective one the first plurality of readout transistors (e.g., 536A1/536B1, 536A2/536B2, . . . , 536AN/536BN) after all of the memory nodes have sampled and held the plurality of subframe portions of the first and second portions of the charge responsive to the charge from the first and second floating diffusions (e.g., 532A/532B).

It is appreciated that burst pixel circuit configurations may be utilized in situations where readout speeds are too slow for pipelined pixel circuit configurations. For instance, in an example with N=8, 8 subframes of phase charge information may be sampled and held in 8 memory nodes in sequence. After the 8 subframes of phase charge information have been stored in the respective 8 memory nodes, the 8 memory nodes may then be subsequently read out in sequence with reduced readout speed requirements after the integration period as there is typically a gap between integration exposure periods.

In the various examples, the first modulation signal TXA and second modulation signal TXB are configured to modulate the first transfer transistor 520A and the second transfer transistor 520B. In the examples, the first modulation signal TXA and second modulation signal TXB are modulation signals that are 180° out of phase or inverted versions of each other during the multiple subframes in which the time-of-flight pixel circuit 512 is modulated. For instance, in one example, in a first subframe, the first modulation signal TXA may be the 0° phase modulation signal 214A while the second modulation signal TXB is therefore the 180° phase modulation signal 214B. In that example, in another subframe, the first modulation signal TXA and the second modulation signal TXB are inverted relative to their respective signals in the first subframe. In other words, in that example, in the other subframe, the first modulation signal TXA is the 180° phase modulation signal 216B while the second modulation signal TXB is the 0° phase modulation signal 214A. In the various examples, it is appreciated that the first and second transfer transistors 520A and 520B may also be modulated with 90°/270° phase modulation signals as well as with the opposing phases of 270°/90° phase modulation signals in multiple subframes.

By modulating the first transfer transistor 520A and the second transfer transistor 520B with the first modulation signal TXA and second modulation signal TXB with the opposing phases of the 0°/180° and 180°/0° phase modulation signal as well as with the opposing phases of the 90°/270° and 270°/90° phase modulation signals in the multiple subframes as described, offset errors as well as dark current errors in the time-of-flight pixel circuits are canceled or removed in accordance with the teachings of the present invention.

In the various examples, the first modulation signal TXA and second modulation signal TXB may also be modulated at different frequencies in different subframes, which improves systematic errors, such as for example harmonic distortions or multipath artifacts in accordance with the teachings of the present invention. For instance, in one example, the first modulation signal TXA and second modulation signal TXB are configured to alternate between two different modulation frequencies f1 and f2 for each subframe. In other words, in one example, the first modulation signal TXA and second modulation signal TXB are configured to be modulated at a modulation frequency f1 during a first subframe, and then a modulation frequency f2 during a second subframe. Then, in a third subframe, the first modulation signal TXA and second modulation signal TXB are configured to be modulated at the modulation frequency f1, and then in a fourth subframe, the first modulation signal TXA and second modulation signal TXB are configured to be modulated at the modulation frequency f2, and so on.

Figure 6:
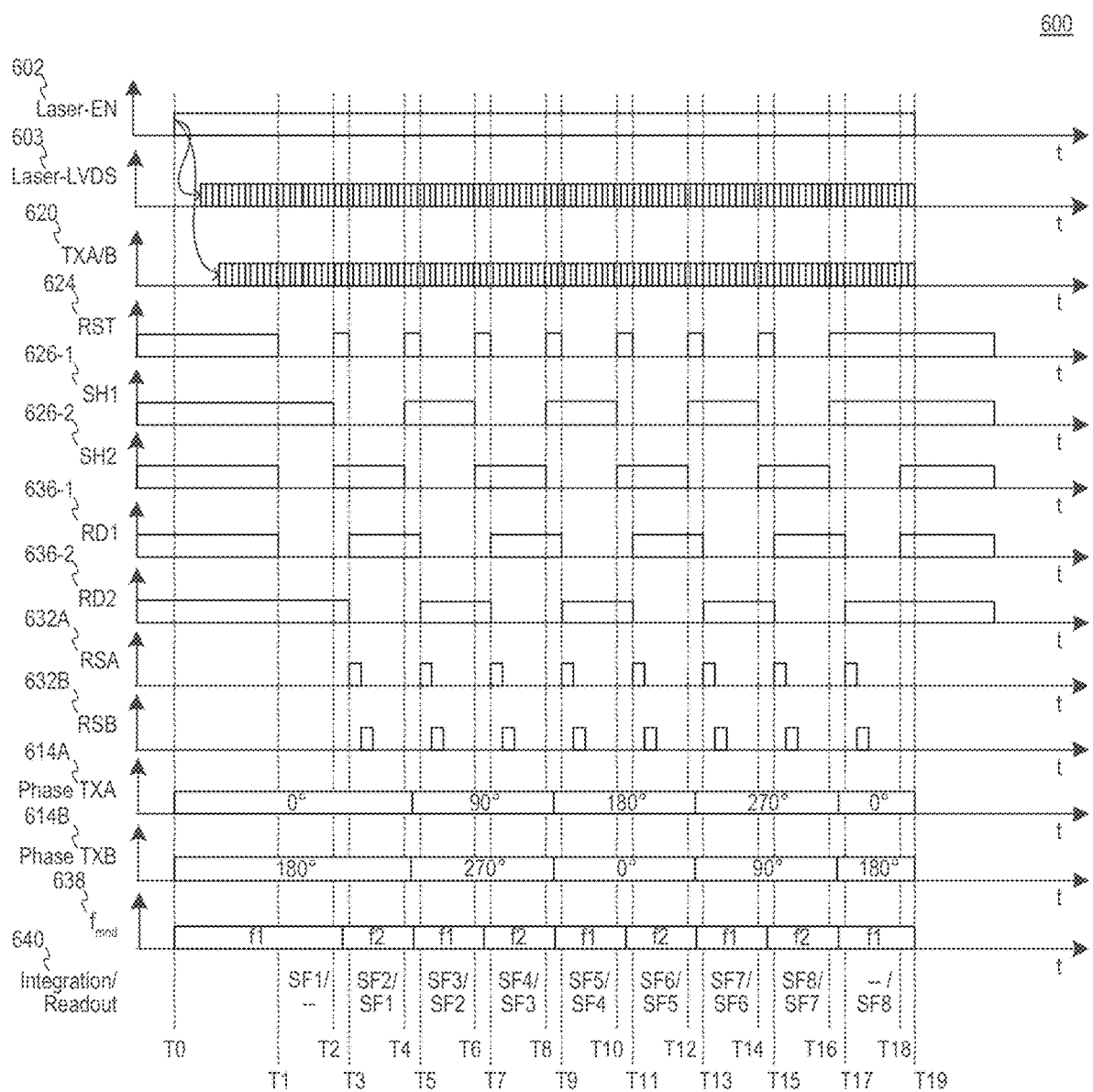
FIG. 6 is an example timing diagram illustrating signals in an example time-of-flight sensing system with pipelined operations in accordance with the teachings of the present invention.

FIG. 6 is an example timing diagram 600 illustrating signals in an example time-of-flight sensing system with pipelined operations in accordance with the teachings of the present invention. It is appreciated that the signals illustrated in the timing diagram 600 of FIG. 6 may be examples of the signals found during operation of the time-of-flight sensing system 100 as illustrated in FIG. 1 including a pixel array of time-of-flight pixels 312 as illustrated in FIG. 3, and that similarly named and numbered elements described above are coupled and function similarly below.

In the example depicted in FIG. 6, it is assumed for illustration purposes that the time-of-flight pixel circuits 312 are configured as pipelined pixel circuits such that there are two memory nodes (e.g., N=2) per output tap. It is appreciated that the timing diagram 600 of FIG. 6 illustrates the example signals that occur with respect the example used to describe Equations (3)-(24) above.

As shown in the depicted example, at time T0, a laser enable (Laser-EN) signal 602 is activated, which enables the light source 102. As such, the laser low voltage differential signal (Laser-LVDS) 603 as well as the first and second modulation signals (TXA/B) 620 are synchronized and oscillate as shown. At time T0, it is noted that the reset signal 624 as well as the sample and hold signals SH1 626-1, SH2 626-2 and the readout signals RD1 636-1, RD2 636-2 are also activated, which resets or initializes the first and second floating diffusions (FDA, FDB) as well as the memory nodes (C1A, C2A, C1B, C2B) in time-of-flight pixel circuit 312.

Between time T1 and T2, the integration of subframe 1 (SF1) occurs, which is indicated with Integration/Readout 640. During the integration that occurs during subframe SF1, the reset signal 624 is deactivated and the first modulation signal TXA is modulated with a 0° phase modulation signal, which is indicated with Phase TXA 614A, and the second modulation signal TXB is modulated with a 180° phase modulation signal, which is indicated with Phase TXB 614B. In addition, it is noted that the modulation signals are modulated at a first modulation frequency f1, as indicated with $f_{mod}$ 638. During this subframe SF1 integration time, the 0° portion of charge (e.g., $Q_0$) is sampled and held in a first memory node of a first output tap (e.g., C1A) and the 180° portion of charge is (e.g., $Q_{180}$) is sampled and held in a first memory node of a second output tap (e.g., C1B).

After the subframe SF1 integration between time T1 and T2, the reset signal RST 624 is activated, the first sample and hold signal SH1 626-1 is deactivated, and the second sample and hold signal SH2 626-2 is activated between time T2 and T3. As such, the first and second floating diffusions (FDA, FDB) the second memory nodes (e.g., C2A, C2B) in time-of-flight pixel circuit 312 are reset. However, the subframe portions of charge that are sampled in the first memory nodes (e.g., C1A, C1B) remain held since the first sample and hold signal SH1 626-1 is deactivated.

Between time T3 and T4, the subframe SF2 integration occurs, and a readout occurs of the previous integration that occurred during subframe SF1, which is indicated with the Integration/Readout 640 between time T3 and T4. It is noted that during the subframe SF2 integration that occurs between time T3 and T4, the modulation signals are modulated at a second modulation frequency f2, as indicated with $f_{mod}$ 638. During the subframe SF1 readout that occurs between time T3 and T4, the first readout signal RD1 is activated, the second readout signal RD2 is deactivated, and the row select signals RSA 632A and RSB 632B are pulsed to read out the VA and VB signals from the first memory nodes (e.g., C1A, C1B) at the two output taps of time-of-flight pixel circuit 312. In addition, during the subframe SF2 integration that occurs between time T3 and T4, the first sample and hold signal SH1 626-1 is deactivated while the second sample and hold signal SH2 626-2 is activated. During this integration time, the 0° portion of charge (e.g., $Q_0$) is sampled and held in a second memory node of a first output tap (e.g., C2A) and the 180° portion of charge is (e.g., $Q_{180}$) is sampled and held in a second memory node of a second output tap (e.g., C2B).

After the subframe SF2 integration and the subframe SF1 readout between time T3 and T4, the reset signal RST 624 is activated, the first sample and hold signal SH1 626-1 is activated, and the second sample and hold signal SH2 626-2 is deactivated between time T4 and T5. As such, the first and second floating diffusions (FDA, FDB) and the first memory nodes (e.g., C1A, C1B) in time-of-flight pixel circuit 312 are reset. However, the subframe portions of charge that are sampled in the second memory nodes (e.g., C2A, C2B) remain held since the second sample and hold signal SH2 626-2 is deactivated.

Between time T5 and T6, the subframe SF3 integration occurs and the subframe SF2 readout occurs as indicated with the Integration/Readout 640 between time T5 and T6. During the integration that occurs during subframe SF3, the first modulation signal TXA is modulated with a 90° phase modulation signal, as indicated with Phase TXA 614A and the second modulation signal TXB is modulated with a 270° phase modulation signal, as indicated with Phase TXB 614B. In addition, it is noted that during the subframe SF3 integration that occurs between time T5 and T6, the modulation signals are modulated at a first modulation frequency f1, as indicated with $f_{mod}$ 638. During this SF3 integration time, the 90° portion of charge (e.g., $Q_{90}$) is sampled and held in a first memory node of a first output tap (e.g., C1A) and the 270° portion of charge is (e.g., $Q_{270}$) is sampled and held in a first memory node of a second output tap (e.g., C1B). During the subframe SF2 readout that occurs between time T5 and T6, the first readout signal RD1 is deactivated, the second readout signal RD2 is activated, and the row select signals RSA 632A and RSB 632B are pulsed to read out the VA and VB signals from the second memory nodes (e.g., C2A, C2B) at the two output taps of time-of-flight pixel circuit 312.

After the integration of subframe SF3 and readout of subframe SF2 between time T5 and T6, the reset signal RST 624 is activated, the first sample and hold signal SH1 626-1 is deactivated, and the second sample and hold signal SH2 626-2 is activated between time T6 and T7. As such, the first and second floating diffusions (FDA, FDB) and the second memory nodes (e.g., C2A, C2B) in time-of-flight pixel circuit 312 are reset. However, the subframe portions of charge that are sampled in the first memory nodes (e.g., C1A, C1B) remain held since the first sample and hold signal SH1 626-1 is deactivated.

Between time T7 and T8, the subframe SF4 integration occurs and the subframe SF3 readout occurs as indicated with the Integration/Readout 640 between time T7 and T8. It is noted that during the subframe SF4 integration that occurs between time T7 and T8, the modulation signals are modulated at the second modulation frequency f2, as indicated with $f_{mod}$ 638. During the subframe SF3 readout that occurs between time T7 and T8, the first readout signal RD1 is activated, the second readout signal RD2 is deactivated, and the row select signals RSA 632A and RSB 632B are pulsed to read out the VA and VB signals from the first memory nodes (e.g., C1A, C1B) at the two output taps of time-of-flight pixel circuit 312. In addition, during the subframe SF4 integration that occurs between time T7 and T8, the first sample and hold signal SH1 626-1 is deactivated while the second sample and hold signal SH2 626-2 is activated. During this integration time, the 90° portion of charge (e.g., $Q_{90}$) is sampled and held in a second memory node of a first output tap (e.g., C2A) and the 270° portion of charge (e.g., $Q_{270}$) is sampled and held in a second memory node of a second output tap (e.g., C2B).

After the subframe SF4 integration and the subframe SF3 readout between time T7 and T8, the reset signal RST 624 is activated, the first sample and hold signal SH1 626-1 is activated, and the second sample and hold signal SH2 626-2 is deactivated between time T8 and T9. As such, the first and second floating diffusions (FDA, FDB) and the first memory nodes (e.g., C1A, C1B) in time-of-flight pixel circuit 312 are reset. However, the subframe portions of charge that are sampled in the second memory nodes (e.g., C2A, C2B) remain held since the second sample and hold signal SH2 626-2 is deactivated.

Between time T9 and T10, the subframe SF5 integration occurs and the subframe SF4 readout occurs as indicated with the Integration/Readout 640 between time T9 and T10. During the integration that occurs during subframe SF5, the first modulation signal TXA is modulated with a 180° phase modulation signal, as indicated with Phase TXA 614A and the second modulation signal TXB is modulated with a 0° phase modulation signal, as indicated with Phase TXB 614B. In addition, it is noted that during the subframe SF5 integration that occurs between time T9 and T10, the modulation signals are modulated at a first modulation frequency f1, as indicated with $f_{mod}$ 638. During this SF5 integration time, the 180° portion of charge (e.g., $Q_{180}$) is sampled and held in a first memory node of a first output tap (e.g., C1A)

and the 0° portion of charge is (e.g., $Q_0$) is sampled and held in a first memory node of a second output tap (e.g., C1B). During the subframe SF4 readout that occurs between time T9 and T10, the first readout signal RD1 is deactivated, the second readout signal RD2 is activated, and the row select signals RSA 632A and RSB 632B are pulsed to read out the VA and VB signals from the second memory nodes (e.g., C2A, C2B) at the two output taps of time-of-flight pixel circuit 312.

After the subframe SF5 integration and the subframe SF4 readout between time T9 and T10, the reset signal RST 624 is activated, the first sample and hold signal SH1 626-1 is deactivated, and the second sample and hold signal SH2 626-2 is activated between time T10 and T11. As such, the first and second floating diffusions (FDA, FDB) and the second memory nodes (e.g., C2A, C2B) in time-of-flight pixel circuit 312 are reset. However, the subframe portions of charge that are sampled in the first memory nodes (e.g., C1A, C1B) remain held since the first sample and hold signal SH1 626-1 is deactivated.

Between time T11 and T12, the subframe SF6 integration occurs and the SF5 readout occurs as indicated with the Integration/Readout 640 between time T11 and T12. It is noted that during the subframe SF6 integration that occurs between time T11 and T12, the modulation signals are modulated at the second modulation frequency f2, as indicated with $f_{mod}$ 638. During the subframe SF5 readout that occurs between time T11 and T12, the first readout signal RD1 is activated, the second readout signal RD2 is deactivated, and the row select signals RSA 632A and RSB 632B are pulsed to read out the VA and VB signals from the first memory nodes (e.g., C1A, C1B) at the two output taps of time-of-flight pixel circuit 312. In addition, during the subframe SF6 integration that occurs between time T11 and T12, the first sample and hold signal SH1 626-1 is deactivated while the second sample and hold signal SH2 626-2 is activated. During this integration time, the 180° portion of charge (e.g., $Q_{180}$) is sampled and held in a second memory node of a first output tap (e.g., C2A) and the 0° portion of charge (e.g., $Q_0$) is sampled and held in a second memory node of a second output tap (e.g., C2B).

After the subframe SF6 integration and the subframe SF5 readout between time T11 and T12, the reset signal RST 624 is activated, the first sample and hold signal SH1 626-1 is activated, and the second sample and hold signal SH2 626-2 is deactivated between time T12 and T13. As such, the first and second floating diffusions (FDA, FDB) and the first memory nodes (e.g., C1A, C1B) in time-of-flight pixel circuit 312 are reset. However, the subframe portions of charge that are sampled in the second memory nodes (e.g., C2A, C2B) remain held since the second sample and hold signal SH2 626-2 is deactivated.

Between time T13 and T14, the subframe SF7 integration occurs and the subframe SF6 readout occurs as indicated with the Integration/Readout 640 between time T13 and T14. During the integration that occurs during subframe SF7, the first modulation signal TXA is modulated with a 270° phase modulation signal, as indicated with Phase TXA 614A and the second modulation signal TXB is modulated with a 90° phase modulation signal, as indicated with Phase TXB 614B. In addition, it is noted that during the subframe SF7 integration that occurs between time T13 and T14, the modulation signals are modulated at a first modulation frequency f1, as indicated with $f_{mod}$ 638. During this SF7 integration time, the 270° portion of charge (e.g., $Q_{270}$) is sampled and held in a first memory node of a first output tap (e.g., C1A) and the 90° portion of charge is (e.g., $Q_{90}$) is sampled and held in a first memory node of a second output tap (e.g., C1B). During the subframe SF6 readout that occurs between time T13 and T14, the first readout signal RD1 is deactivated, the second readout signal RD2 is activated, and the row select signals RSA 632A and RSB 632B are pulsed to read out the $V_A$ and VB signals from the second memory nodes (e.g., C2A, C2B) at the two output taps of time-of-flight pixel circuit 312.

After the subframe SF7 integration and the subframe S6 readout between time T13 and T14, the reset signal RST 624 is activated, the first sample and hold signal SH1 626-1 is deactivated, and the second sample and hold signal SH2 626-2 is activated between time T14 and T15. As such, the first and second floating diffusions (FDA, FDB) and the second memory nodes (e.g., C2A, C2B) in time-of-flight pixel circuit 312 are reset. However, the subframe portions of charge that are sampled in the first memory nodes (e.g., C1A, C1B) remain held since the first sample and hold signal SH1 626-1 is deactivated.

Between time T15 and T16, the subframe SF8 integration occurs and the SF7 readout occurs as indicated with the Integration/Readout 640 between time T15 and T16. It is noted that during the subframe SF8 integration that occurs between time T15 and T16, the modulation signals are modulated at the second modulation frequency f2, as indicated with $f_{mod}$ 638. During the subframe SF7 readout that occurs between time T15 and T16, the first readout signal RD1 is activated, the second readout signal RD2 is deactivated, and the row select signals RSA 632A and RSB 632B are pulsed to read out the VA and VB signals from the first memory nodes (e.g., C1A, C1B) at the two output taps of time-of-flight pixel circuit 312. In addition, during the subframe SF8 integration that occurs between time T15 and T16, the first sample and hold signal SH1 626-1 is deactivated while the second sample and hold signal SH2 626-2 is activated. During this integration time, the 270° portion of charge (e.g., $Q_{270}$) is sampled and held in a second memory node of a first output tap (e.g., C2A) and the 90° portion of charge (e.g., $Q_{90}$) is sampled and held in a second memory node of a second output tap (e.g., C2B).

After the subframe SF8 integration and the subframe SF7 readout between time T15 and T16, the reset signal RST 624 is activated, the first sample and hold signal SH1 626-1 is activated, and the second sample and hold signal SH2 626-2 is deactivated between time T16 and T17. As such, the first and second floating diffusions (FDA, FDB) and the first memory nodes (e.g., C1A, C1B) in time-of-flight pixel circuit 312 are reset. However, the subframe portions of charge that are sampled in the second memory nodes (e.g., C2A, C2B) remain held since the second sample and hold signal SH2 626-2 is deactivated.

Between time T17 and T18, there is no integration and the subframe SF8 readout occurs as indicated with the Integration/Readout 640 between time T17 and T18. During the subframe SF8 readout that occurs between time T17 and T18, the first readout signal RD1 is deactivated, the second readout signal RD2 is activated, and the row select signals RSA 632A and RSB 632B are pulsed to read out the VA and VB signals from the second memory nodes (e.g., C2A, C2B) at the two output taps of time-of-flight pixel circuit 312.

Figure 7:
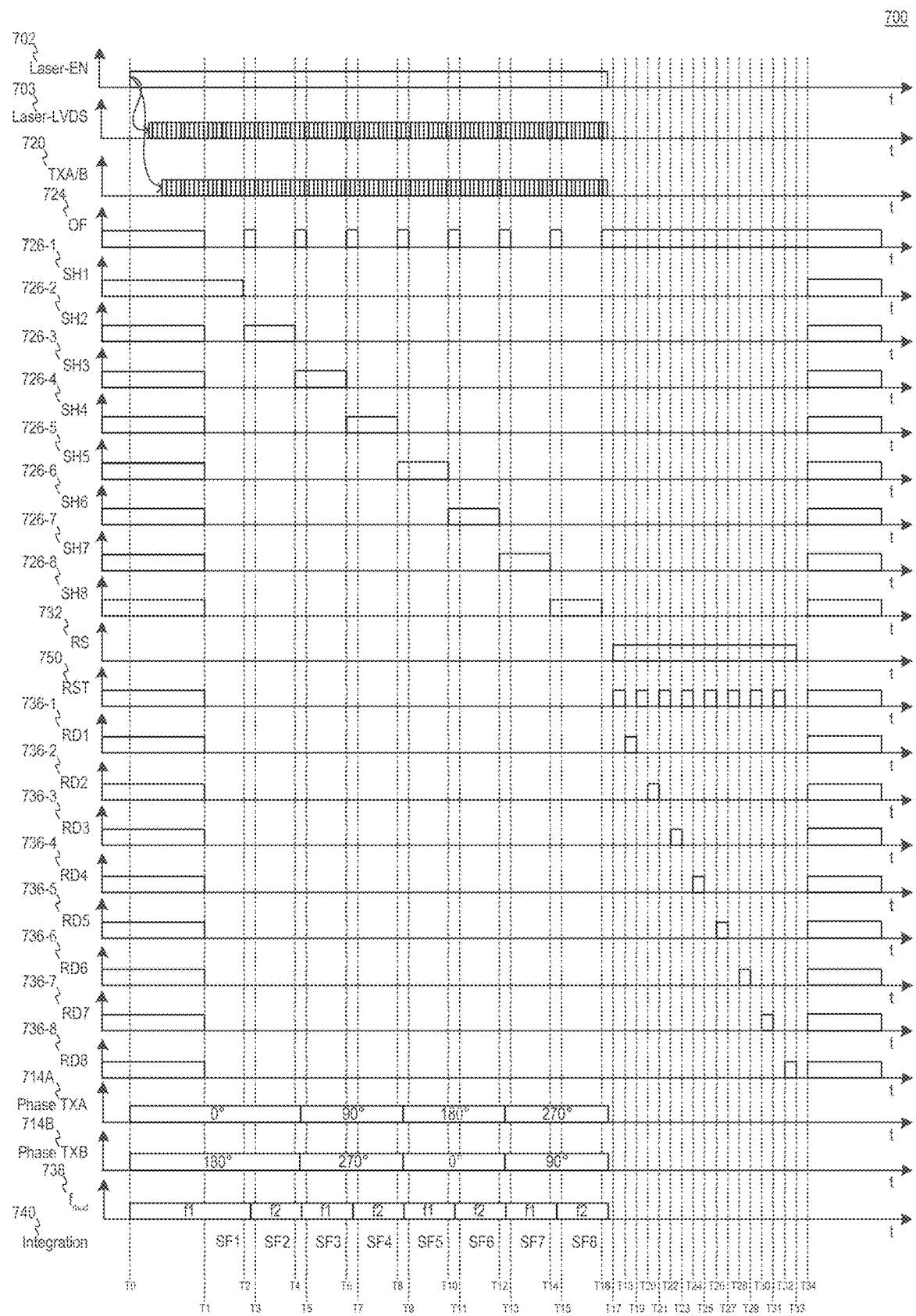
FIG. 7 is another example timing diagram illustrating signals in an example time-of-flight sensing system with burst operations in accordance with the teachings of the present invention.

FIG. 7 is another example timing diagram 700 illustrating signals in an example time-of-flight sensing system with burst operations in accordance with the teachings of the present invention. It is appreciated that the signals illustrated in the timing diagram 700 of FIG. 7 may be examples of the signals found during operation of the time-of-flight sensing system 100 as illustrated in FIG. 1 including a pixel array of time-of-flight pixels 512 as illustrated in FIG. 5, and that similarly named and numbered elements described above are coupled and function similarly below.

In the example depicted FIG. 7, it is assumed for illustration purposes that the time-of-flight pixel circuits 512 are configured as burxt pixel circuits such that there are eight memory nodes (e.g., N=8) per output tap. It is appreciated that the timing diagram 700 of FIG. 7 also illustrates the example signals that occur with respect the example used to describe Equations (3)-(24) above.

As shown in the depicted example, at time T0, a laser enable (Laser-EN) signal 702 is activated, which enables the light source 102. As such, the laser low voltage differential signal (Laser-LVDS) 703 as well as the first and second modulation signals (TXA/B) 720 are synchronized and oscillate as shown. At time T0, it is noted that the overflow signal OF 724, the sample and hold signals SH1 726-1 to SH8 726-8, the readout signals RD1 636-1 to RD8 636-8, and the reset signal RST 750, which resets or initializes the first and second floating diffusions (FDA, FDB) as well as the memory nodes (C1A to C8A and C1B to C8B) in time-of-flight pixel circuit 512.

As will be shown in FIG. 7, between time T1 and time T16, an integration period occurs and the TXA and TXB portions of charge from the photodiode 518 are sampled and held in sequence (e.g., one after another in time) into respective memory nodes (e.g., 534A1/534B1, 534A2/534B2, 534A3/534B3, 534A4/534B4, 534A5/534B5, 534A6/534B6, 534A7/534B7, 534A8/534B8) from the first and second amplifying source follower transistors (e.g., 544A/544B) in response to the charge in respective floating diffusions (e.g., 522A/522B) through respective sample and hold transistors (e.g., 526A1/526B1, 526A2/526B2, 526A3/526B3, 526A4/526B4, 526A5/526B5, 526A6/526B6, 526A7/526B7, 526A8/526B8).

In particular, at time T1, the integration period begins as the overflow signal OF 724, the sample and hold signals SH2 726-2 to SH8 726-8, the readout signals RD1 736-1 to RD8 736-8, and the reset signal RST 750 are all deactivated. Between time T1 and T2, the integration of subframe 1 (SF1) occurs, which is indicated with Integration 740 and the sample and hold signal SH1 726-1 remaining active. During the integration that occurs during subframe SF1, the first modulation signal TXA is modulated with a 0° phase modulation signal, which is indicated with Phase TXA 714A, and the second modulation signal TXB is modulated with a 180° phase modulation signal, which is indicated with Phase TXB 714B. In addition, it is noted that the modulation signals are modulated at a first modulation frequency f1, as indicated with $f_{mod}$ 738. During this subframe SF1 integration time, the 0° portion of charge (e.g., $Q_0$) is sampled and held in a first memory node of a first output tap (e.g., C1A) and the 180° portion of charge is (e.g., $Q_{180}$) is sampled and held in a first memory node of a second output tap (e.g., C1B).

After the subframe SF1 integration between time T1 and T2, the overflow signal OF 724 may be activated, the first sample and hold signal SH1 726-1 is deactivated, and the second sample and hold signal SH2 726-2 is activated between time T2 and T3. As such, the first and second floating diffusions (FDA, FDB) and the second memory nodes (e.g., C2A, C2B) in time-of-flight pixel circuit 512 are reset. However, the subframe portions of charge that are sampled in the first memory nodes (e.g., C1A, C1B) remain held since the first sample and hold signal SH1 726-1 is deactivated.

Between time T3 and T4, the subframe SF2 integration occurs, which is indicated with the Integration 740 between time T3 and T4. It is noted that during the subframe SF2 integration that occurs between time T3 and T4, the modulation signals are modulated at a second modulation frequency f2, as indicated with $f_{mod}$ 738. During the subframe SF2 integration that occurs between time T3 and T4, the second sample and hold signal SH2 726-2 is activated and the overflow signal OF 724 is deactivated. During this integration time, the 0° portion of charge (e.g., $Q_0$) is sampled and held in a second memory node of a first output tap (e.g., C2A) and the 180° portion of charge is (e.g., $Q_{180}$) is sampled and held in a second memory node of a second output tap (e.g., C2B).

After the subframe SF2 integration between time T3 and T4, the overflow signal OF 724 may be activated, the second sample and hold signal SH2 726-2 is deactivated, and the third sample and hold signal SH3 726-3 is activated between time T4 and T5. As such, the first and second floating diffusions (FDA, FDB) and the third memory nodes (e.g., C3A, C3B) in time-of-flight pixel circuit 512 are reset. However, the subframe portions of charge that are sampled in the first and second memory nodes (e.g., C1A/C1B, C2A/C2B) remain held since the first and second sample and hold signals SH1 726-1, SH2 726-2 are deactivated.

Between time T5 and T6, the subframe SF3 integration occurs, which is indicated with the Integration 740 between time T5 and T6. It is noted that during the subframe SF3 integration that occurs between time T5 and T6, the modulation signals are modulated at the first modulation frequency f1, as indicated with $f_{mod}$ 738. During the subframe SF3 integration that occurs between time T5 and T6, the third sample and hold signal SH3 726-3 is activated and the overflow signal OF 724 is deactivated. During this integration time, the 90° portion of charge (e.g., $Q_{90}$) is sampled and held in a third memory node of a first output tap (e.g., C3A) and the 270° portion of charge is (e.g., $Q_{270}$) is sampled and held in a third memory node of a second output tap (e.g., C3B).

After the subframe SF3 integration between time T5 and T6, the overflow signal OF 724 may be activated, the third sample and hold signal SH3 726-3 is deactivated, and the fourth sample and hold signal SH4 726-4 is activated between time T6 and T7. As such, the first and second floating diffusions (FDA, FDB) and the fourth memory nodes (e.g., C4A, C4B) in time-of-flight pixel circuit 512 are reset. However, the subframe portions of charge that are sampled in the first to third memory nodes (e.g., C1A/C1B to C3A/C3B) remain held since the first to third sample and hold signals SH1 726-1 to SH3 726-3 are deactivated.

Between time T7 and T8, the subframe SF4 integration occurs, which is indicated with the Integration 740 between time T7 and T8. It is noted that during the subframe SF4 integration that occurs between time T7 and T8, the modulation signals are modulated at the second modulation frequency f2, as indicated with $f_{mod}$ 738. During the subframe SF4 integration that occurs between time T7 and T8, the fourth sample and hold signal SH4 726-4 is activated and the overflow signal OF 724 is deactivated. During this integration time, the 90° portion of charge (e.g., $Q_{90}$) is sampled and held in a fourth memory node of a first output tap (e.g., C4A) and the 270° portion of charge is (e.g., $Q_{270}$) is sampled and held in a fourth memory node of a second output tap (e.g., C4B).

After the subframe SF4 integration between time T7 and T8, the overflow signal OF 724 may be activated, the fourth sample and hold signal SH4 726-4 is deactivated, and the fifth sample and hold signal SH5 726-5 is activated between time T8 and T9. As such, the first and second floating diffusions (FDA, FDB) and the fifth memory nodes (e.g., C5A, C5B) in time-of-flight pixel circuit 512 are reset. However, the subframe portions of charge that are sampled in the first to fourth memory nodes (e.g., C1A/C1B to C4A/C4B) remain held since the first to fourth sample and hold signals SH1 726-1 to SH4 726-4 are deactivated.

Between time T9 and T10, the subframe SF5 integration occurs, which is indicated with the Integration 740 between time T9 and T10. It is noted that during the subframe SF5 integration that occurs between time T9 and T10, the modulation signals are modulated at the first modulation frequency f1, as indicated with $f_{mod}$ 738. During the subframe SF5 integration that occurs between time T9 and T10, the fifth sample and hold signal SH5 726-5 is activated and the overflow signal OF 724 is deactivated. During this integration time, the 180° portion of charge (e.g., $Q_{180}$) is sampled and held in a fifth memory node of a first output tap (e.g., C5A) and the 0° portion of charge is (e.g., $Q_0$) is sampled and held in a fifth memory node of a second output tap (e.g., C5B).

After the subframe SF5 integration between time T9 and T10, the overflow signal OF 724 may be activated, the fifth sample and hold signal SH5 726-5 is deactivated, and the sixth sample and hold signal SH6 726-6 is activated between time T10 and T11. As such, the first and second floating diffusions (FDA, FDB) and the sixth memory nodes (e.g., C6A, C6B) in time-of-flight pixel circuit 512 are reset. However, the subframe portions of charge that are sampled in the first to fifth memory nodes (e.g., C1A/C1B to C5A/C5B) remain held since the first to fifth sample and hold signals SH1 726-1 to SH5 726-5 are deactivated.

Between time T11 and T12, the subframe SF6 integration occurs, which is indicated with the Integration 740 between time T11 and T12. It is noted that during the subframe SF6 integration that occurs between time T11 and T12, the modulation signals are modulated at the second modulation frequency f2, as indicated with $f_{mod}$ 738. During the subframe SF6 integration that occurs between time T11 and T12, the sixth sample and hold signal SH6 726-6 is activated and the overflow signal OF 724 is deactivated. During this integration time, the 180° portion of charge (e.g., $Q_{180}$) is sampled and held in a sixth memory node of a first output tap (e.g., C6A) and the 0° portion of charge is (e.g., $Q_0$) is sampled and held in a sixth memory node of a second output tap (e.g., C6B).

After the subframe SF6 integration between time T11 and T12, the overflow signal OF 724 may be activated, the sixth sample and hold signal SH6 726-6 is deactivated, and the seventh sample and hold signal SH7 726-7 is activated between time T12 and T13. As such, the first and second floating diffusions (FDA, FDB) and the seventh memory nodes (e.g., C7A, C7B) in time-of-flight pixel circuit 512 are reset. However, the subframe portions of charge that are sampled in the first to sixth memory nodes (e.g., C1A/C1B to C6A/C6B) remain held since the first to sixth sample and hold signals SH1 726-1 to SH6 726-6 are deactivated.

Between time T13 and T14, the subframe SF7 integration occurs, which is indicated with the Integration 740 between time T13 and T14. It is noted that during the subframe SF7 integration that occurs between time T13 and T14, the modulation signals are modulated at the first modulation frequency f1, as indicated with $f_{mod}$ 738. During the subframe SF7 integration that occurs between time T13 and T14, the seventh sample and hold signal SH7 726-7 is activated and the overflow signal OF 724 is deactivated. During this integration time, the 270° portion of charge (e.g., $Q_{270}$) is sampled and held in a seventh memory node of a first output tap (e.g., C7A) and the 90° portion of charge is (e.g., $Q_0$) is sampled and held in a seventh memory node of a second output tap (e.g., C7B).

After the subframe SF7 integration between time T13 and T14, the overflow signal OF 724 may be activated, the seventh sample and hold signal SH7 726-7 is deactivated, and the eighth sample and hold signal SH8 726-8 is activated between time T14 and T15. As such, the first and second floating diffusions (FDA, FDB) and the eighth memory nodes (e.g., C8A, C8B) in time-of-flight pixel circuit 512 are reset. However, the subframe portions of charge that are sampled in the first to seventh memory nodes (e.g., C1A/C1B to C7A/C7B) remain held since the first to sixth sample and hold signals SH1 726-1 to SH6 726-6 are deactivated.

Between time T15 and T16, the subframe SF8 integration occurs, which is indicated with the Integration 740 between time T15 and T16. It is noted that during the subframe SF8 integration that occurs between time T15 and T16, the modulation signals are modulated at the second modulation frequency f2, as indicated with $f_{mod}$ 738. During the subframe SF8 integration that occurs between time T15 and T16, the eighth sample and hold signal SH8 726-8 is activated and the overflow signal OF 724 is deactivated. During this integration time, the 270° portion of charge (e.g., $Q_{270}$) is sampled and held in an eighth memory node of a first output tap (e.g., C8A) and the 90° portion of charge is (e.g., $Q_{90}$) is sampled and held in an eighth memory node of a second output tap (e.g., C8B).

As shown in the depicted example, after the integration period that occurs between time T1 and time T16, all of the memory nodes C1A to C8A and C1B to C8B have sampled and hold their respective subframe portions of the charge in sequence as discussed above. As such, the overflow signal OF 724 is activated after time T16. As will be shown, the respective subframe portions of the charge may then be read out in sequence (e.g., one after another in time) through respective readout transistors during a readout period, which occurs during the time period from time T17 to T33. As such, the row select signal RS 732 is activated during time T17 to T33.

At time T17, the reset signal RST 750 is activated, which resets or precharges that gate of source followers 530A/530B. At time T18, the reset signal RST 750 is deactivated and the first readout signal RD1 736-1 is activated, which enables the SF1 portions sampled and held in the first memory nodes (e.g., C1A/C1B) to be read out through source followers 530A/530B.

At time T19, the first readout signal RD1 736-1 is deactivated and the reset signal RST 750 is activated, which resets or precharges that gate of source followers 530A/530B. At time T20, the reset signal RST 750 is deactivated and the second readout signal RD2 736-2 is activated, which enables the SF2 portions sampled and held in the second memory nodes (e.g., C2A/C2B) to be read out through source followers 530A/530B.

At time T21, the second readout signal RD2 736-2 is deactivated and the reset signal RST 750 is activated, which resets or precharges that gate of source followers 530A/530B. At time T22, the reset signal RST 750 is deactivated and the third readout signal RD3 736-3 is activated, which enables the SF3 portions sampled and held in the third memory nodes (e.g., C3A/C3B) to be read out through source followers 530A/530B.

At time T23, the third readout signal RD3 736-3 is deactivated and the reset signal RST 750 is activated, which resets or precharges that gate of source followers 530A/530B. At time T24, the reset signal RST 750 is deactivated and the fourth readout signal RD4 736-4 is activated, which enables the SF4 portions sampled and held in the fourth memory nodes (e.g., C4A/C4B) to be read out through source followers 530A/530B.

At time T25, the fourth readout signal RD4 736-4 is deactivated and the reset signal RST 750 is activated, which resets or precharges that gate of source followers 530A/530B. At time T26, the reset signal RST 750 is deactivated and the fifth readout signal RD5 736-5 is activated, which enables the SF5 portions sampled and held in the fifth memory nodes (e.g., C5A/C5B) to be read out through source followers 530A/530B.

At time T27, the fifth readout signal RD5 736-5 is deactivated and the reset signal RST 750 is activated, which resets or precharges that gate of source followers 530A/530B. At time T28, the reset signal RST 750 is deactivated and the sixth readout signal RD6 736-6 is activated, which enables the SF6 portions sampled and held in the sixth memory nodes (e.g., C6A/C6B) to be read out through source followers 530A/530B.

At time T29, the sixth readout signal RD6 736-6 is deactivated and the reset signal RST 750 is activated, which resets or precharges that gate of source followers 530A/530B. At time T30, the reset signal RST 750 is deactivated and the seventh readout signal RD7 736-7 is activated, which enables the SF7 portions sampled and held in the seventh memory nodes (e.g., C7A/C7B) to be read out through source followers 530A/530B.

At time T31, the seventh readout signal RD7 736-7 is deactivated and the reset signal RST 750 is activated, which resets or precharges that gate of source followers 530A/530B. At time T32, the reset signal RST 750 is deactivated and the eighth readout signal RD8 736-8 is activated, which enables the SF8 portions sampled and held in the eighth memory nodes (e.g., C8A/C8B) to be read out through source followers 530A/530B.

As shown in the depicted example, after the readout period that occurs between time T17 and time T22, the subframe portions of the charge that have been sampled and held in all of the memory nodes C1A to C8A and C1B to C8B have now been read out in sequence as described above.

As such, the overflow signal OF 724, the sample and hold signals SH1 726-1 to SH8 726-8, the readout signals RD1 636-1 to RD8 636-8, and the reset signal RST 750, may all be reactivated after time T34 to reset or reinitialize the first and second floating diffusions (FDA, FDB) as well as the memory nodes (C1A to C8A and C1B to C8B) in time-of-flight pixel circuit 512.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A time-of-flight pixel circuit, comprising:
a photodiode configured to generate charge in response to modulated light emitted from a light source and reflected from an object to the photodiode;
a first transfer transistor coupled to the photodiode;
a second transfer transistor coupled to the photodiode, wherein the first transfer transistor is configured to transfer a first portion of charge from the photodiode in response to a first modulation signal, wherein the second transfer transistor is configured to transfer a second portion of charge from the photodiode in response to a second modulation signal, wherein the second modulation signal is an inverted first modulation signal;
a first floating diffusion coupled to the first transfer transistor to receive the first portion of charge in response to the first modulation signal;
a first plurality of memory nodes;
a first plurality of sample and hold transistors, wherein each one of the first plurality of sample and hold transistors is coupled between a respective one of the first plurality of memory nodes and the first transfer transistor;
a first output source follower transistor;
a first plurality of readout transistors, wherein each one of the first plurality of readout transistors is coupled between the respective one of the first plurality of memory nodes and a gate of the first output source follower transistor; and
a first row select transistor coupled to the first output source follower transistor,
wherein:
a first one of the first plurality of memory nodes is coupled to the first floating diffusion through a first one of the first plurality of sample and hold transistors during a first subframe,
a second one of the first plurality of memory nodes is coupled to the first floating diffusion through a second one of the first plurality of sample and hold transistors during a second subframe, and
the first one of the first plurality of memory nodes is coupled to the gate of the first output source follower transistor through a first one of the first plurality of readout transistors during the second subframe.

2. The time-of-flight pixel circuit of claim 1,
wherein the second one of the first plurality of memory nodes is coupled to the gate of the first output source follower transistor through a second one of the first plurality of readout transistors during a third subframe,
wherein the first one of the first plurality of memory nodes is coupled to the first floating diffusion through the first one of the first plurality of sample and hold transistors during the third subframe.

3. The time-of-flight pixel circuit of claim 2,
wherein the first modulation signal and the second modulation signal are configured to be modulated at a first modulation frequency during the first subframe and the third subframe,
wherein the first modulation signal and the second modulation signal are further configured to be modulated at a second modulation frequency during the second subframe and a fourth subframe.

4. The time-of-flight pixel circuit of claim 3,
wherein the first modulation signal is configured to be in phase with modulated light emitted from the light source during the first subframe and the second subframe, wherein the first modulation signal is further configured to be 90 degrees out of phase with modulated light emitted from the light source during the third subframe and the fourth subframe.

5. The time-of-flight pixel circuit of claim 4,
wherein the first modulation signal is further configured to be 180 degrees out of phase with modulated light emitted from the light source during a fifth subframe and a sixth subframe,
wherein the first modulation signal is further configured to be 270 degrees out of phase with modulated light emitted from the light source during a seventh subframe and an eighth subframe,
wherein the first modulation signal and the second modulation signal are further configured to be modulated at the first modulation frequency during the fifth subframe and the seventh subframe,
wherein the first modulation signal and the second modulation signal are further configured to be modulated at the second modulation frequency during the sixth subframe and the eighth subframe.

6. The time-of-flight pixel circuit of claim 5, further comprising a first reset transistor coupled between a supply rail and the first floating diffusion, wherein the first reset transistor is configured to reset the first floating diffusion.

7. The time-of-flight pixel circuit of claim 6, wherein the first reset transistor is coupled to receive an overflow signal.

8. The time-of-flight pixel circuit of claim 7, further comprising a first output reset transistor coupled between the supply rail and the gate of the first output source follower transistor.

9. The time-of-flight pixel circuit of claim 7, further comprising:
a first floating diffusion capacitor coupled to the first floating diffusion; and
a first amplifying stage coupled between the first floating diffusion and the first plurality of sample and hold transistors.

10. The time-of-flight pixel circuit of claim 9, wherein the first amplifying stage comprises:
a first amplifying source follower transistor having a gate coupled to the first floating diffusion and a source coupled to the first plurality of sample and hold transistors;
a first enable transistor; and
a first bias transistor coupled to the first enable transistor, wherein the first enable transistor and the first bias transistor are coupled between the source of the first amplifying source follower transistor and ground.

11. The time-of-flight pixel circuit of claim 6, further comprising:
a second floating diffusion coupled to the second transfer transistor to receive the second portion of charge in response to the second modulation signal;
a second plurality of memory nodes; and
a second plurality of sample and hold transistors, wherein each one of the second plurality of sample and hold transistors is coupled between a respective one of the second plurality of memory nodes and the second transfer transistor.

12. The time-of-flight pixel circuit of claim 11, further comprising:
a second output source follower transistor;
a second plurality of readout transistors, wherein each one of the second plurality of readout transistors is coupled between the respective one of the second plurality of memory nodes and a gate of the second output source follower transistor; and
a second row select transistor coupled to the second output source follower transistor.

13. The time-of-flight pixel circuit of claim 12,
wherein a first one of the second plurality of memory nodes is coupled to the second floating diffusion through a first one of the second plurality of sample and hold transistors during the first subframe,
wherein a second one of the second plurality of memory nodes is coupled to the second floating diffusion through a second one of the second plurality of sample and hold transistors during the second subframe,
wherein the first one of the second plurality of memory nodes is coupled to the gate of the second output source follower transistor through a second one of the first plurality of readout transistors during the second subframe.

14. The time-of-flight pixel circuit of claim 13,
wherein the second one of the second plurality of memory nodes is coupled to the gate of the second output source follower transistor through a second one of the second plurality of readout transistors during the third subframe,
wherein the first one of the second plurality of memory nodes is coupled to the second floating diffusion through the second one of the second plurality of sample and hold transistors during the third subframe.

15. The time-of-flight pixel circuit of claim 14, further comprising a second reset transistor coupled between the supply rail and the second floating diffusion, wherein the second reset transistor is configured to reset the second floating diffusion.

16. The time-of-flight pixel circuit of claim 15, wherein the second reset transistor is coupled to receive an overflow signal.

17. The time-of-flight pixel circuit of claim 16, further comprising a second output reset transistor coupled between the supply rail and the gate of the second output source follower transistor.

18. The time-of-flight pixel circuit of claim 16, further comprising:
a second floating diffusion capacitor coupled to the second floating diffusion; and
a second amplifying stage coupled between the second floating diffusion and the second plurality of sample and hold transistors.

19. The time-of-flight pixel circuit of claim 18, wherein the second amplifying stage comprises:
a second amplifying source follower transistor having a gate coupled to the second floating diffusion and a source coupled to the second plurality of sample and hold transistors;
a second enable transistor; and
a second bias transistor coupled to the second enable transistor, wherein the second enable transistor and the second bias transistor are coupled between the source of the second amplifying source follower transistor and ground.

20. A time-of-flight pixel circuit, comprising:
a photodiode configured to generate charge in response to modulated light emitted from a light source and reflected from an object to the photodiode;
a first transfer transistor coupled to the photodiode;
a second transfer transistor coupled to the photodiode, wherein the first transfer transistor is configured to transfer a first portion of charge from the photodiode in response to a first modulation signal, wherein the second transfer transistor is configured to transfer a second portion of charge from the photodiode in response to a second modulation signal, wherein the second modulation signal is an inverted first modulation signal;
a first floating diffusion coupled to the first transfer transistor to receive the first portion of charge in response to the first modulation signal;
a first plurality of memory nodes;
a first plurality of sample and hold transistors, wherein each one of the first plurality of sample and hold transistors is coupled between a respective one of the first plurality of memory nodes and the first transfer transistor;
a first output source follower transistor;
a first plurality of readout transistors, wherein each one of the first plurality of readout transistors is coupled between the respective one of the first plurality of memory nodes and a gate of the first output source follower transistor; and
a first row select transistor coupled to the first output source follower transistor,
wherein:
each one of the first plurality of memory nodes is coupled to sample and hold one of a plurality of subframe portions of the first portion of charge from the first floating diffusion through a respective one of the first plurality of sample and hold transistors,
each one of the plurality of subframe portions of the first portion of charge is coupled to be read out from the respective one of the first plurality of memory nodes through a respective one of the first plurality of readout transistors after all of the first plurality of memory nodes have sampled and held the plurality of subframe portions of the first portion of charge from the first floating diffusion,
the first modulation signal is configured to be a first phase modulation signal during a first one of the plurality of subframes and a second one of the plurality of subframes,
the first modulation signal is further configured to be a third phase modulation signal during a third one of the plurality of subframes and a fourth one of the plurality of subframes,
the first modulation signal is further configured to be a second phase modulation signal during a fifth one of the plurality of subframes and a sixth one of the plurality of subframes, and
the first modulation signal is further configured to be a fourth phase modulation signal during a seventh one of the plurality of subframes and an eighth one of the plurality of subframes.

21. The time-of-flight pixel circuit of claim 20,
wherein the first modulation signal is configured to be modulated at a first modulation frequency during the first, the third, the fifth, and the seventh ones of the plurality of subframes,
wherein the first modulation signal is configured to be modulated at a second modulation frequency during the second, the fourth, the sixth, and the eighth ones of the plurality of subframes.

22. The time-of-flight pixel circuit of claim 21, further comprising:

a second floating diffusion coupled to the second transfer transistor to receive the second portion of charge in response to the second modulation signal;
a second plurality of memory nodes; and
a second plurality of sample and hold transistors, wherein each one of the second plurality of sample and hold transistors is coupled between a respective one of the second plurality of memory nodes and the second transfer transistor.

23. The time-of-flight pixel circuit of claim 22, further comprising:
a second output source follower transistor;
a second plurality of readout transistors, wherein each one of the second plurality of readout transistors is coupled between the respective one of the second plurality of memory nodes and a gate of the second output source follower transistor; and
a second row select transistor coupled to the second output source follower transistor.

24. The time-of-flight pixel circuit of claim 23,
wherein each one of the second plurality of memory nodes is coupled to sample and hold one of a plurality of subframe portions of the second portion of charge from the second floating diffusion through a respective one of the second plurality of sample and hold transistors,
wherein each one of the plurality of subframe portions of the second portion of charge is coupled to be read out from the respective one of the second plurality of memory nodes through a respective one of the second plurality of readout transistors after all of the second plurality of memory nodes have sampled and held the plurality of subframe portions of the second portion of charge from the second floating diffusion.

25. The time-of-flight pixel circuit of claim 24,
wherein the second modulation signal is configured to be the second phase modulation signal during the first one of the plurality of subframes and the second one of the plurality of subframes,
wherein the second modulation signal is further configured the fourth phase modulation signal during the third one of the plurality of subframes and the fourth one of the plurality of subframes,
wherein the second modulation signal is further configured to be the first phase modulation signal during the fifth one of the plurality of subframes and the sixth one of the plurality of subframes,
wherein the second modulation signal is further configured to be the third phase modulation signal during the seventh one of the plurality of subframes and the eighth one of the plurality of subframes.

26. The time-of-flight pixel circuit of claim 25,
wherein the second modulation signal is configured to be modulated at the first modulation frequency during the first, the third, the fifth, and the seventh ones of the plurality of subframes,
wherein the second modulation signal is configured to be modulated at the second modulation frequency during the second, the fourth, the sixth, and the eighth ones of the plurality of subframes.

27. The time-of-flight pixel circuit of claim 26,
wherein the first phase modulation signal is configured to be in phase with the modulated light emitted from the light source,
wherein the second phase modulation signal is configured to be 90 degrees out of phase with the modulated light emitted from the light source, wherein the third phase modulation signal is configured to be 180 degrees out of phase with the modulated light emitted from the light source,
wherein the fourth phase modulation signal is configured to be 270 degrees out of phase with the modulated light emitted from the light source.

28. A time-of-flight sensing system, comprising:
a light source configured to emit modulated light to an object; and
a time-of-flight pixel array configured to be illuminated with the modulated light reflected from the object, wherein the time-of-flight pixel array comprises a plurality of time-of-flight pixel circuits, wherein each one of the plurality of time-of-flight pixel circuits comprises:
  a photodiode configured to generate charge in response to the modulated light reflected from the object to the photodiode;
  a first transfer transistor coupled to the photodiode;
  a second transfer transistor coupled to the photodiode, wherein the first transfer transistor is configured to transfer a first portion of charge from the photodiode in response to a first modulation signal, wherein the second transfer transistor is configured to transfer a second portion of charge from the photodiode in response to a second modulation signal, wherein the second modulation signal is an inverted first modulation signal;
  a first floating diffusion coupled to the first transfer transistor to receive the first portion of charge in response to the first modulation signal;
  a first plurality of memory nodes;
  a first plurality of sample and hold transistors, wherein each one of the first plurality of sample and hold transistors is coupled between a respective one of the first plurality of memory nodes and the first transfer transistor;
  a first output source follower transistor;
  a first plurality of readout transistors, wherein each one of the first plurality of readout transistors is coupled between the respective one of the first plurality of memory nodes and a gate of the first output source follower transistor; and
  a first row select transistor coupled to the first output source follower transistor,
wherein:
  wherein a first one of the first plurality of memory nodes is coupled to the first floating diffusion through a first one of the first plurality of sample and hold transistors during a first subframe,
  wherein a second one of the first plurality of memory nodes is coupled to the first floating diffusion through a second one of the first plurality of sample and hold transistors during a second subframe,
  wherein the first one of the first plurality of memory nodes is coupled to the gate of the first output source follower transistor through a first one of the first plurality of readout transistors during the second subframe.

29. The time-of-flight sensing system of claim 28,
wherein the second one of the first plurality of memory nodes is coupled to the gate of the first output source follower transistor through a second one of the first plurality of readout transistors during a third subframe,
wherein the first one of the first plurality of memory nodes is coupled to the first floating diffusion through the first one of the first plurality of sample and hold transistors during the third subframe.

30. The time-of-flight sensing system of claim 29,
wherein the first modulation signal and the second modulation signal are configured to be modulated at a first modulation frequency during the first subframe and the third subframe,
wherein the first modulation signal and the second modulation signal are further configured to be modulated at a second modulation frequency during the second subframe and a fourth subframe.

31. The time-of-flight sensing system of claim 30,
wherein the first modulation signal is configured to be in phase with modulated light emitted from the light source during the first subframe and the second subframe,
wherein the first modulation signal is further configured to be 90 degrees out of phase with modulated light emitted from the light source during the third subframe and the fourth subframe.

32. The time-of-flight sensing system of claim 31,
wherein the first modulation signal is further configured to be 180 degrees out of phase with modulated light emitted from the light source during a fifth subframe and a sixth subframe,
wherein the first modulation signal is further configured to be 270 degrees out of phase with modulated light emitted from the light source during a seventh subframe and an eighth subframe,
wherein the first modulation signal and the second modulation signal are further configured to be modulated at the first modulation frequency during the fifth subframe and the seventh subframe,
wherein the first modulation signal and the second modulation signal are further configured to be modulated at the second modulation frequency during the sixth subframe and the eighth subframe.

33. The time-of-flight sensing system of claim 32, wherein each one of the plurality of time-of-flight pixel circuits further comprises a first reset transistor coupled between a supply rail and the first floating diffusion, wherein the first reset transistor is configured to reset the first floating diffusion.

34. The time-of-flight sensing system of claim 33, wherein the first reset transistor is coupled to receive an overflow signal.

35. The time-of-flight sensing system of claim 34, wherein each one of the plurality of time-of-flight pixel circuits further comprises a first output reset transistor coupled between the supply rail and the gate of the first output source follower transistor.

36. The time-of-flight sensing system of claim 35, wherein each one of the plurality of time-of-flight pixel circuits further comprises:
  a first floating diffusion capacitor coupled to the first floating diffusion; and
  a first amplifying stage coupled between the first floating diffusion and the first plurality of sample and hold transistors.

37. The time-of-flight sensing system of claim 36, wherein the first amplifying stage comprises:
  a first amplifying source follower transistor having a gate coupled to the first floating diffusion and a source coupled to the first plurality of sample and hold transistors;

a first enable transistor; and
a first bias transistor coupled to the first enable transistor, wherein the first enable transistor and the first bias transistor are coupled between the source of the first amplifying source follower transistor and ground.

38. The time-of-flight sensing system of claim 33, further comprising:
a second floating diffusion coupled to the second transfer transistor to receive the second portion of charge in response to the second modulation signal;
a second plurality of memory nodes; and
a second plurality of sample and hold transistors, wherein each one of the second plurality of sample and hold transistors is coupled between a respective one of the second plurality of memory nodes and the second transfer transistor.

39. The time-of-flight sensing system of claim 38, further comprising:
a second output source follower transistor;
a second plurality of readout transistors, wherein each one of the second plurality of readout transistors is coupled between the respective one of the second plurality of memory nodes and a gate of the second output source follower transistor; and
a second row select transistor coupled to the second output source follower transistor.

40. The time-of-flight sensing system of claim 39,
wherein a first one of the second plurality of memory nodes is coupled to the second floating diffusion through a first one of the second plurality of sample and hold transistors during the first subframe,
wherein a second one of the second plurality of memory nodes is coupled to the second floating diffusion through a second one of the second plurality of sample and hold transistors during the second subframe,
wherein the first one of the second plurality of memory nodes is coupled to the gate of the second output source follower transistor through a second one of the first plurality of readout transistors during the second subframe.

41. The time-of-flight sensing system of claim 40,
wherein the second one of the second plurality of memory nodes is coupled to the gate of the second output source follower transistor through a second one of the second plurality of readout transistors during the third subframe,
wherein the first one of the second plurality of memory nodes is coupled to the second floating diffusion through the second one of the second plurality of sample and hold transistors during the third subframe.

42. The time-of-flight sensing system of claim 41, wherein each one of the plurality of time-of-flight pixel circuits further comprises a second reset transistor coupled between the supply rail and the second floating diffusion, wherein the second reset transistor is configured to reset the second floating diffusion.

43. The time-of-flight sensing system of claim 42, wherein the second reset transistor is coupled to receive an overflow signal.

44. The time-of-flight sensing system of claim 43, wherein each one of the plurality of time-of-flight pixel circuits further comprises a second output reset transistor coupled between the supply rail and the gate of the second output source follower transistor.

45. The time-of-flight sensing system of claim 43, wherein each one of the plurality of time-of-flight pixel circuits further comprises:
a second floating diffusion capacitor coupled to the second floating diffusion; and
a second amplifying stage coupled between the second floating diffusion and the second plurality of sample and hold transistors.

46. The time-of-flight sensing system of claim 45, wherein the second amplifying stage comprises:
a second amplifying source follower transistor having a gate coupled to the second floating diffusion and a source coupled to the second plurality of sample and hold transistors;
a second enable transistor; and
a second bias transistor coupled to the second enable transistor, wherein the second enable transistor and the second bias transistor are coupled between the source of the second amplifying source follower transistor and ground.

47. A time-of-flight sensing system, comprising:
a light source configured to emit modulated light to an object; and
a time-of-flight pixel array configured to be illuminated with the modulated light reflected from the object, wherein the time-of-flight pixel array comprises a plurality of time-of-flight pixel circuits, wherein each one of the plurality of time-of-flight pixel circuits comprises:
a photodiode configured to generate charge in response to the modulated light reflected from the object to the photodiode;
a first transfer transistor coupled to the photodiode;
a second transfer transistor coupled to the photodiode, wherein the first transfer transistor is configured to transfer a first portion of charge from the photodiode in response to a first modulation signal, wherein the second transfer transistor is configured to transfer a second portion of charge from the photodiode in response to a second modulation signal, wherein the second modulation signal is an inverted first modulation signal;
a first floating diffusion coupled to the first transfer transistor to receive the first portion of charge in response to the first modulation signal;
a first plurality of memory nodes;
a first plurality of sample and hold transistors, wherein each one of the first plurality of sample and hold transistors is coupled between a respective one of the first plurality of memory nodes and the first transfer transistor;
a first output source follower transistor;
a first plurality of readout transistors, wherein each one of the first plurality of readout transistors is coupled between the respective one of the first plurality of memory nodes and a gate of the first output source follower transistor; and
a first row select transistor coupled to the first output source follower transistor,
wherein:
each one of the first plurality of memory nodes is coupled to sample and hold one of a plurality of subframe portions of the first portion of charge from the first floating diffusion through a respective one of the first plurality of sample and hold transistors,
each one of the plurality of subframe portions of the first portion of charge is coupled to be read out from the respective one of the first plurality of memory nodes through a respective one of the first plurality of readout transistors after all of the first plurality of memory nodes have sampled and held the plurality of subframe portions of the first portion of charge from the first floating diffusion, the first modulation signal is configured to be a first phase modulation signal during a first one of the plurality of subframes and a second one of the plurality of subframes, the first modulation signal is further configured to be a third phase modulation signal during a third one of the plurality of subframes and a fourth one of the plurality of subframes, the first modulation signal is further configured to be a second phase modulation signal during a fifth one of the plurality of subframes and a sixth one of the plurality of subframes, and the first modulation signal is further configured to be a fourth phase modulation signal during a seventh one of the plurality of subframes and an eighth one of the plurality of subframes.

48. The time-of-flight sensing system of claim 47, wherein the first modulation signal is configured to be modulated at a first modulation frequency during the first, the third, the fifth, and the seventh ones of the plurality of subframes, wherein the first modulation signal is configured to be modulated at a second modulation frequency during the second, the fourth, the sixth, and the eighth ones of the plurality of subframes.

49. The time-of-flight sensing system of claim 48, further comprising:

a second floating diffusion coupled to the second transfer transistor to receive the second portion of charge in response to the second modulation signal;

a second plurality of memory nodes; and a second plurality of sample and hold transistors, wherein each one of the second plurality of sample and hold transistors is coupled between a respective one of the second plurality of memory nodes and the second transfer transistor.

50. The time-of-flight sensing system of claim 49, further comprising:

a second output source follower transistor;

a second plurality of readout transistors, wherein each one of the second plurality of readout transistors is coupled between the respective one of the second plurality of memory nodes and a gate of the second output source follower transistor; and a second row select transistor coupled to the second output source follower transistor.

51. The time-of-flight sensing system of claim 50, wherein each one of the second plurality of memory nodes is coupled to sample and hold one of a plurality of subframe portions of the second portion of charge from the second floating diffusion through a respective one of the second plurality of sample and hold transistors, wherein each one of the plurality of subframe portions of the second portion of charge is coupled to be read out from the respective one of the second plurality of memory nodes through a respective one of the second plurality of readout transistors after all of the second plurality of memory nodes have sampled and held the plurality of subframe portions of the second portion of charge from the second floating diffusion.

52. The time-of-flight sensing system of claim 51, wherein the second modulation signal is configured to be the second phase modulation signal during the first one of the plurality of subframes and the second one of the plurality of subframes, wherein the second modulation signal is further configured the fourth phase modulation signal during the third one of the plurality of subframes and the fourth one of the plurality of subframes, wherein the second modulation signal is further configured to be the first phase modulation signal during the fifth one of the plurality of subframes and the sixth one of the plurality of subframes, wherein the second modulation signal is further configured to be the third phase modulation signal during the seventh one of the plurality of subframes and the eighth one of the plurality of subframes.

53. The time-of-flight sensing system of claim 52, wherein the second modulation signal is configured to be modulated at the first modulation frequency during the first, the third, the fifth, and the seventh ones of the plurality of subframes, wherein the second modulation signal is configured to be modulated at the second modulation frequency during the second, the fourth, the sixth, and the eighth ones of the plurality of subframes.

54. The time-of-flight sensing system of claim 53, wherein the first phase modulation signal is configured to be in phase with the modulated light emitted from the light source, wherein the second phase modulation signal is configured to be 90 degrees out of phase with the modulated light emitted from the light source, wherein the third phase modulation signal is configured to be 180 degrees out of phase with the modulated light emitted from the light source, wherein the fourth phase modulation signal is configured to be 270 degrees out of phase with the modulated light emitted from the light source.

* * * * *